United States Patent
Nakatsuka et al.

(10) Patent No.: US 12,179,659 B2
(45) Date of Patent: Dec. 31, 2024

(54) CONTROL DEVICE

(71) Applicant: HONDA MOTOR CO., LTD., Tokyo (JP)

(72) Inventors: Masayuki Nakatsuka, Saitama (JP); Masatoshi Saito, Kanagawa (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 18/113,889

(22) Filed: Feb. 24, 2023

(65) Prior Publication Data

US 2023/0294599 A1    Sep. 21, 2023

(30) Foreign Application Priority Data

Mar. 16, 2022    (JP) ................. 2022-041458

(51) Int. Cl.
*B60Q 1/50* (2006.01)
*B60Q 1/08* (2006.01)
*B60Q 1/14* (2006.01)

(52) U.S. Cl.
CPC ............ *B60Q 1/525* (2013.01); *B60Q 1/085* (2013.01); *B60Q 1/143* (2013.01);
(Continued)

(58) Field of Classification Search
CPC ........ B60Q 1/525; B60Q 1/085; B60Q 1/143; B60Q 2300/112; B60Q 2300/12;
(Continued)

(56) References Cited

U.S. PATENT DOCUMENTS 10,179,535 B2 *   1/2019   Hoshino ................. B60Q 1/143
11,180,090 B2 * 11/2021   Yoshizaki ............... B60R 1/28
(Continued)

FOREIGN PATENT DOCUMENTS

JP    H 11-031299 A    2/1999
JP    2004-185105 A    7/2004
JP    2011-084106 A    4/2011

OTHER PUBLICATIONS

Oct. 31, 2023, translation of Japanese Office Action issued for related JP Application No. 2022-041458.

*Primary Examiner* — Curtis J King
(74) *Attorney, Agent, or Firm* — Paratus Law Group, PLLC

(57) ABSTRACT

A control device for controlling a host vehicle including: a processing circuitry configured to, when another vehicle traveling in a opposite direction to the host vehicle and having a possibility to collide with the host vehicle is detected in front of the host vehicle, execute an out-of-vehicle notification using a headlight based on a distance between the host vehicle and the another vehicle. When the distance is equal to or smaller than a first threshold and equal to or larger than a second threshold that is smaller than the first threshold, the processing circuitry executes the out-of-vehicle notification, and when the distance is smaller than the second threshold, the processing circuitry does not execute the out-of-vehicle notification or executes the out-of-vehicle notification with a notification intensity lower than that when the distance is equal to or smaller than the first threshold and equal to or larger than the second threshold.

10 Claims, 15 Drawing Sheets

(52) U.S. Cl.
CPC .... *B60Q 2300/112* (2013.01); *B60Q 2300/12* (2013.01); *B60Q 2300/134* (2013.01); *B60Q 2300/322* (2013.01); *B60Q 2300/42* (2013.01); *B60Q 2300/45* (2013.01)

(58) Field of Classification Search
CPC ........ B60Q 2300/134; B60Q 2300/322; B60Q 2300/42; B60Q 2300/45; B60Q 1/46; B60Q 2300/41
See application file for complete search history.

(56) References Cited

U.S. PATENT DOCUMENTS

| | | | |
|---|---|---|---|
| 11,292,488 B2* | 4/2022 | Igarashi | B60W 40/04 |
| 11,505,181 B2* | 11/2022 | Vladimerou | B60W 30/18154 |
| 11,681,299 B2* | 6/2023 | Tiwari | G05D 1/0257 |
| | | | 701/24 |
| 2008/0043099 A1* | 2/2008 | Stein | B60Q 1/143 |
| | | | 348/118 |
| 2016/0176335 A1* | 6/2016 | Hoshino | B60Q 1/143 |
| | | | 362/466 |
| 2016/0217687 A1* | 7/2016 | Rous | H04B 10/116 |
| 2017/0101056 A1* | 4/2017 | Park | G08G 1/162 |
| 2019/0351818 A1* | 11/2019 | Roehm | B60Q 1/143 |
| 2020/0361370 A1* | 11/2020 | Wescott | B60Q 5/006 |
| 2021/0237641 A1* | 8/2021 | Im | B60Q 1/50 |
| 2022/0327932 A1* | 10/2022 | Nakaya | G08G 1/0133 |
| 2023/0052890 A1* | 2/2023 | Benjamin | H04N 5/445 |
| 2023/0182775 A1* | 6/2023 | Beaurepaire | B60W 30/18163 |
| | | | 701/26 |

\* cited by examiner

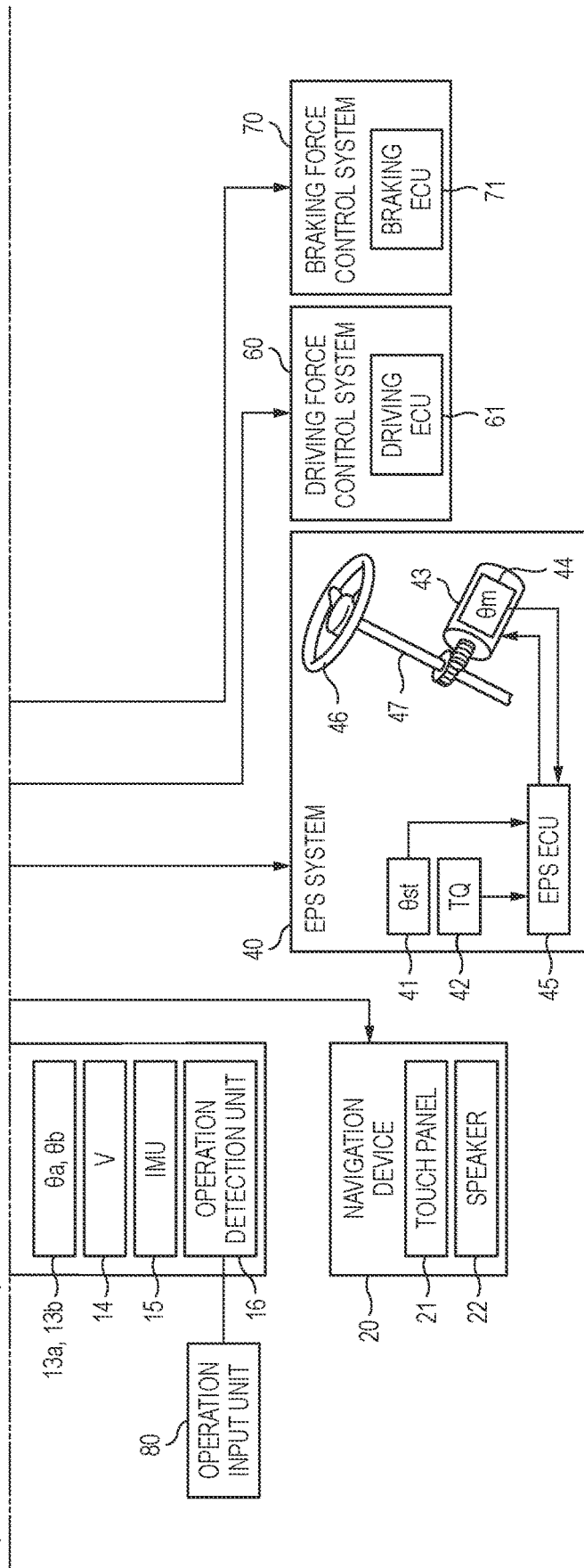

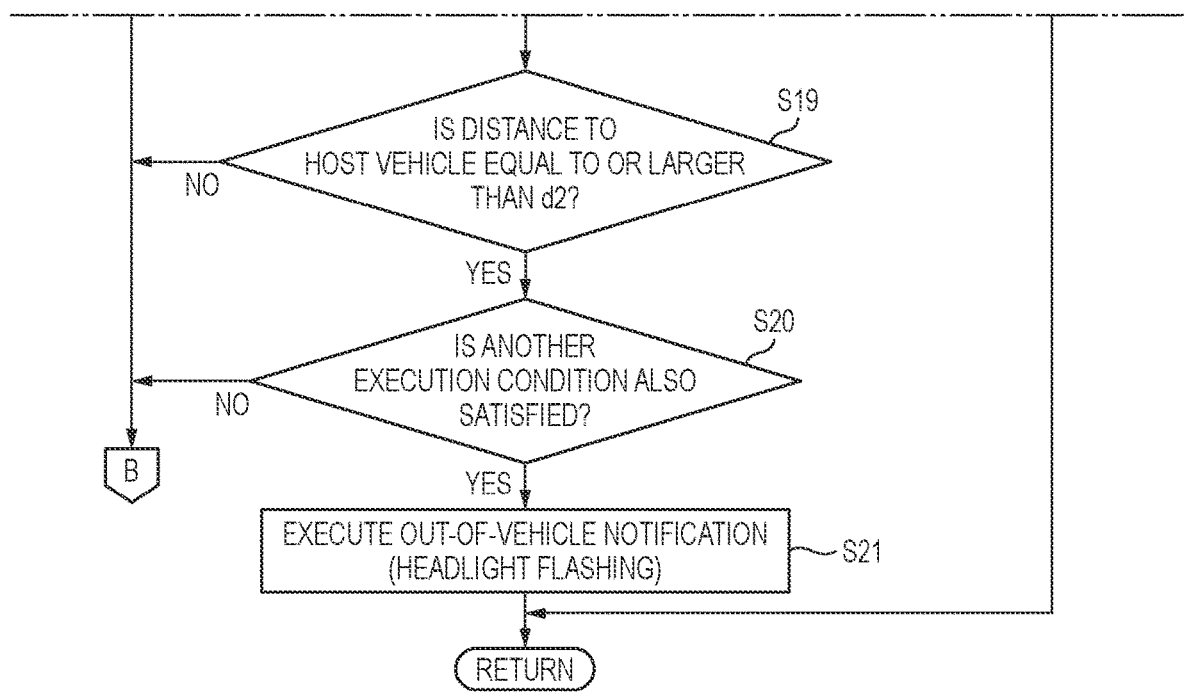

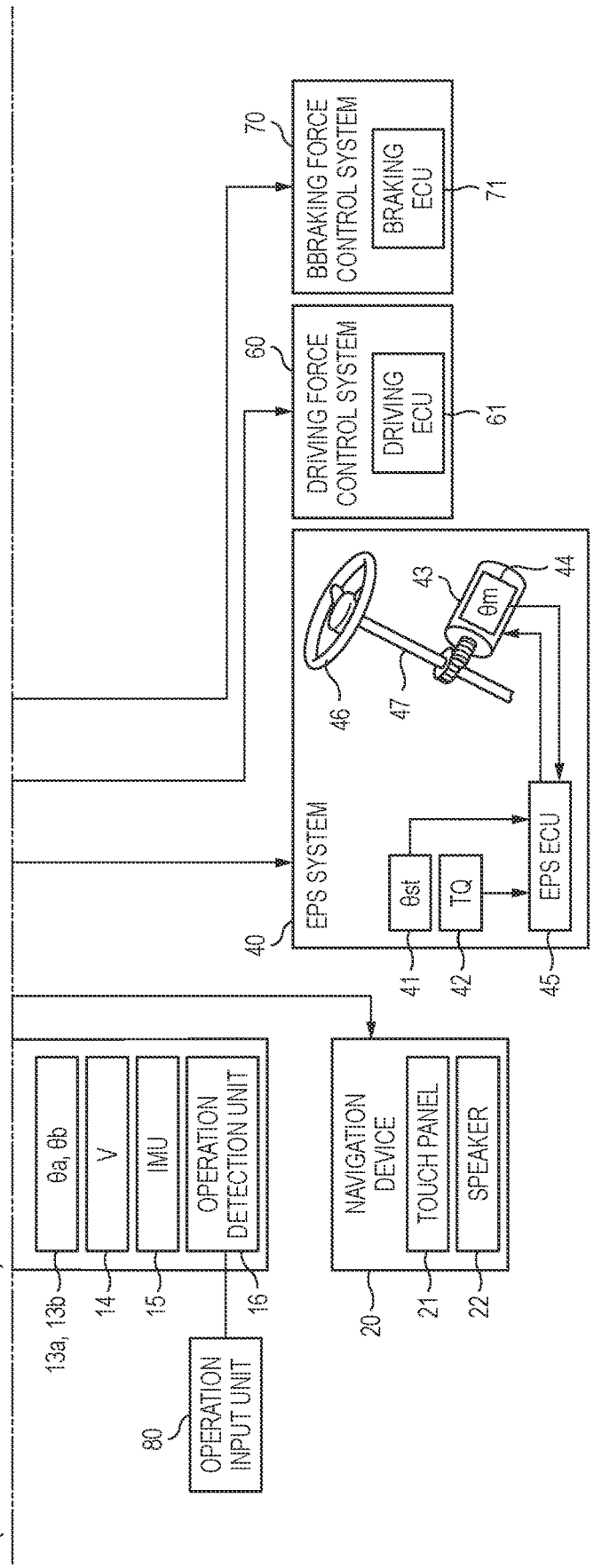

CONTROL DEVICE

CROSS REFERENCE TO RELATED APPLICATIONS

This application claims priority to Japanese Patent Application No. 2022-041458 filed on Mar. 16, 2022, the contents of which are incorporated herein by reference.

TECHNICAL FIELD

The present invention relates to a control device that controls a vehicle.

BACKGROUND ART

In recent years, efforts have been actively made to provide access to sustainable transportation systems in consideration of traffic participants in a vulnerable situation. As one of such efforts, research and development related to a driving assistance technology and an automatic driving technology for vehicles such as automobiles have been conducted in order to further improve safety and convenience of traffic.

JPH11-31299A discloses a vehicle travel control device that calculates a time (collision time) until a collision occurs based on a travel speed of a host vehicle, an inter-vehicle distance, and a relative speed of an oncoming vehicle approaching the host vehicle, and calculates a time (margin time) for the host vehicle to avoid the oncoming vehicle with a margin. When it is determined based on the collision time and the margin time that the host vehicle has no margin to avoid the oncoming vehicle, the present device warns a driver of approaching of the oncoming vehicle and notifies the oncoming vehicle of presence of the host vehicle.

For example, when another vehicle such as an oncoming vehicle that is overtaking is present, it is conceivable to execute, on the other vehicle, an out-of-vehicle notification to notify the other vehicle of presence of a host vehicle using a headlight of the host vehicle. By executing the out-of-vehicle notification using the headlight of the host vehicle, it is possible to notify a driver of the other vehicle of the presence of the host vehicle in an intuitive and easy-to-understand manner without adding a notification device dedicated to the out-of-vehicle notification. On the other hand, the out-of-vehicle notification using the headlight may dazzle the driver of the other vehicle depending on a distance between the host vehicle and the other vehicle.

In recent years, from a viewpoint of safety improvement, increasing are vehicles in which automatic illumination switching control called an "auto-high beam" (also abbreviated as "AHB"), which automatically switches a headlight between a low beam and a high beam, is implemented. In general, a user can switch between execution (in other words, an on state) and non-execution (in other words, an off state) in such automatic illumination switching control, but it is desirable that the out-of-vehicle notification described above would be appropriately executed as necessary regardless of whether the automatic illumination switching control is on or off.

An object of the present invention is to provide a control device capable of appropriately executing an out-of-vehicle notification using a headlight of a host vehicle.

SUMMARY OF INVENTION

According to an aspect of the present invention, there is provided a control device for controlling a vehicle that includes an external sensor configured to acquire surrounding information on a host vehicle and a headlight configured to illuminate ahead of the host vehicle. The control device includes: a processing circuitry configured to, when another vehicle traveling in an opposite direction to the host vehicle and having a possibility to collide with the host vehicle is detected in front of the host vehicle based on the surrounding information acquired by the external sensor, execute an out-of-vehicle notification using the headlight based on a distance between the host vehicle and the another vehicle. When the distance is equal to or smaller than a first threshold and equal to or larger than a second threshold that is smaller than the first threshold, the processing circuitry executes the out-of-vehicle notification, and when the distance is smaller than the second threshold, the processing circuitry does not execute the out-of-vehicle notification or executes the out-of-vehicle notification with a notification intensity lower than that when the distance is equal to or smaller than the first threshold and equal to or larger than the second threshold.

DESCRIPTION OF EMBODIMENTS

Figure 1:
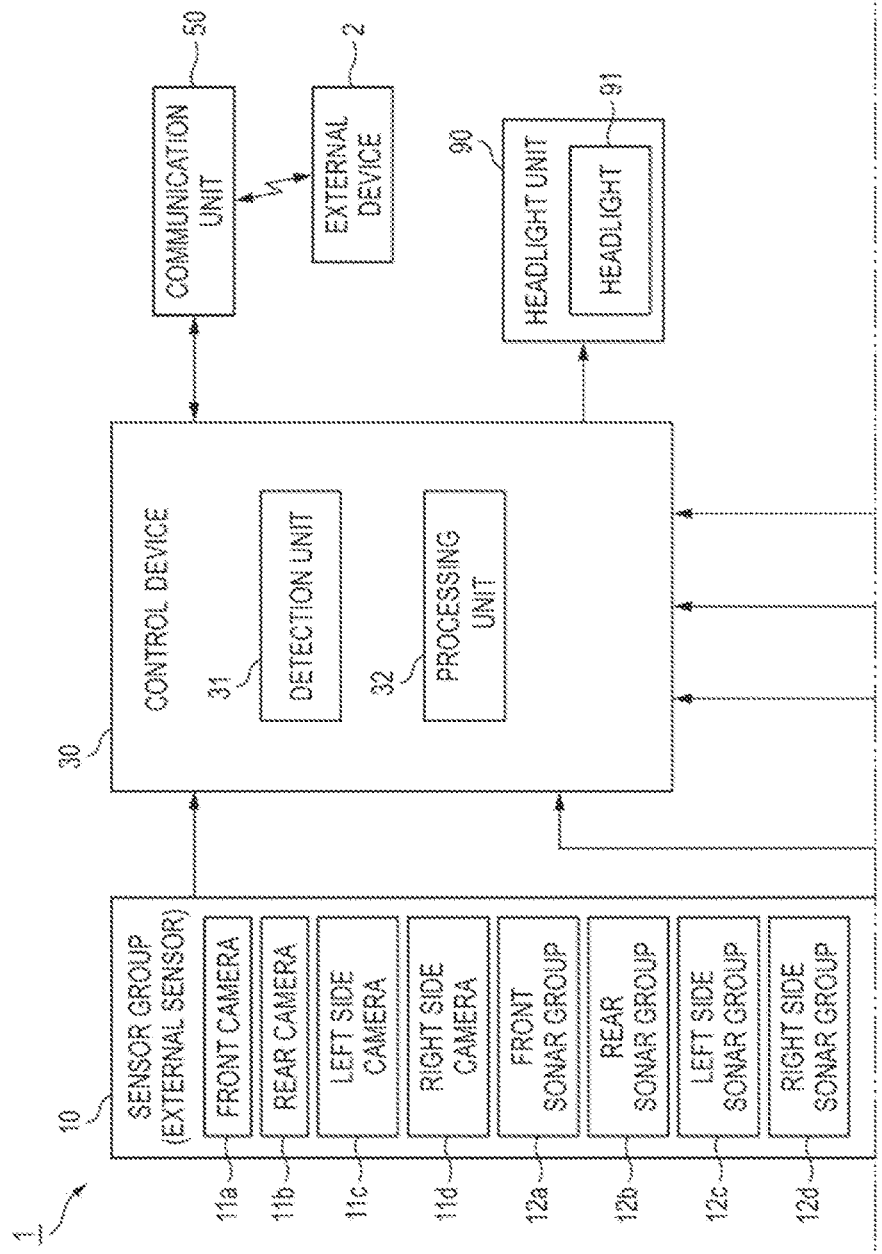
FIG. 1 is a block diagram showing a schematic configuration of a vehicle according to an embodiment.

Hereinafter, an embodiment of a control device according to the present invention will be described in detail with reference to the accompanying drawings. In the following description, the same or similar elements are denoted by the same or similar reference numerals, and description thereof may be omitted or simplified as appropriate.

[Vehicle]

A vehicle 1 (hereinafter, also referred to as an "host vehicle") according to the present embodiment shown in FIG. 1 is an automobile including a drive source and wheels including driven wheels driven by power of the drive source and steered wheels that are steerable (both not shown). For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of the electric motor and the internal combustion engine. The drive source of the vehicle 1 may drive the pair of left and right front wheels, the pair of left and right rear wheels, or four wheels including the pair of left and right front wheels and the pair of left and right rear wheels. The front wheels or the rear wheels may be steered wheels that are steerable, or the front wheels and the rear wheels may both be steered wheels that are steerable.

As shown in FIG. 1, the vehicle 1 includes a sensor group 10, a navigation device 20, a control device 30, which is an example of a control device according to the present invention, an electric power steering system (EPS system) 40, a communication unit 50, a driving force control system 60, a braking force control system 70, an operation input unit 80, and a headlight unit 90.

The sensor group 10 acquires various detection values related to the vehicle 1 or surroundings of the vehicle 1. The detection values acquired by the sensor group 10 are used for control of the vehicle 1 by the control device 30. The sensor group 10 includes a front camera 11a, a rear camera 11b, a left side camera 11c, a right side camera 11d, a front sonar group 12a, a rear sonar group 12b, a left side sonar group 12c, and a right side sonar group 12d. These cameras, sonar groups, radars, lidars, and the like may function as external sensors that acquire surrounding information on the vehicle 1.

The front camera 11a, the rear camera 11b, the left side camera 11c, and the right side camera 11d output, to the control device 30, image data on surrounding images obtained by imaging the surroundings of the vehicle 1. The surrounding images captured by the front camera 11a, the rear camera 11b, the left side camera 11c, and the right side camera 11d are also referred to as a front image, a rear image, a left side image, and a right side image, respectively. An image formed by the left side image and the right side image is also referred to as a side image.

The front sonar group 12a, the rear sonar group 12b, the left sonar group 12c, and the right sonar group 12d emit sound waves to the surroundings of the vehicle 1 and receive reflected sounds from other objects. The front sonar group 12a includes, for example, four sonars. The sonars constituting the front sonar group 12a are provided on an obliquely left front side, a front left side, a front right side, and an obliquely right front side of the vehicle 1, respectively. The rear sonar group 12b includes, for example, four sonars. The sonars constituting the rear sonar group 12b are provided on an obliquely left rear side, a rear left side, a rear right side, and an obliquely right rear side of the vehicle 1, respectively. The left sonar group 12c includes, for example, two sonars. The sonars constituting the left sonar group 12c are provided on a front side of a left side portion and a rear side of the left side portion of the vehicle 1, respectively. The right side sonar group 12d includes, for example, two sonars. The sonars constituting the right side sonar group 12d are provided on a front side of a right side portion and a rear side of the right side portion of the vehicle 1, respectively.

The sensor group 10 further includes wheel sensors 13a, 13b, a vehicle speed sensor 14, an inertial measurement unit (IMU) 15, and an operation detection unit 16. Each of the wheel sensors 13a, 13b detects a rotation angle of a wheel (not shown). Each of the wheel sensors 13a, 13b may be implemented by an angle sensor or a displacement sensor. Each of the wheel sensors 13a, 13b outputs a detection pulse to the control device 30 each time the wheel rotates by a predetermined angle. The detection pulse output from each of the wheel sensors 13a, 13b can be used to calculate the rotation angle of the wheel and a rotation speed of the wheel. A movement distance of the vehicle 1 can be calculated based on the rotation angle of the wheel. The wheel sensor 13a detects, for example, a rotation angle $\theta a$ of a left rear wheel. The wheel sensor 13b detects, for example, a rotation angle $\theta b$ of a right rear wheel.

The vehicle speed sensor 14 detects a travel speed of the vehicle 1 (vehicle body), that is, a vehicle speed V, and outputs the detected vehicle speed V to the control device 30. The vehicle speed sensor 14 detects the vehicle speed V based on, for example, rotation of a countershaft of a transmission.

The inertial measurement unit 15 detects angular velocities of the vehicle 1 in a pitch direction, a roll direction, and a yaw direction and accelerations of the vehicle 1 in a front-rear direction, a left-right direction, and an upper-lower direction, and outputs these detection results to the control device 30. An example in which the inertial measurement unit 15 is provided will be described in the present embodiment, but the present invention is not limited thereto. For example, an acceleration sensor that detects an acceleration of the vehicle 1 in a predetermined direction or a gyro sensor that detects an angular velocity of the vehicle 1 in a predetermined direction may be simply provided instead of the inertial measurement unit 15.

The operation detection unit 16 detects a content of an operation performed by a user using the operation input unit 80, and outputs the detected content of the operation to the control device 30. The operation input unit 80 may include, for example, an operation button that receives an operation of switching between execution (in other words, an ON state) and non-execution (in other words, an OFF state) of automatic illumination switching control to be described later. The operation input unit 80 may be shared with a touch panel 21 to be described later.

The navigation device 20 detects a current position of the vehicle 1 using, for example, a global positioning system (GPS), and guides the user of the vehicle 1 (hereinafter, also simply referred to as the "user") on a route to a destination. The navigation device 20 includes a storage device (not shown) provided with a map information database.

The navigation device 20 includes a touch panel 21 and a speaker 22. The touch panel 21 may function as an input device that receives input of various types of information to the control device 30 and a display device that is controlled by the control device 30. That is, the user can input various commands to the control device 30 via the touch panel 21. A screen for guiding and notifying the user of various types of information may be displayed on the touch panel 21. The speaker 22 outputs various types of information to the user by voice.

Figure 10:
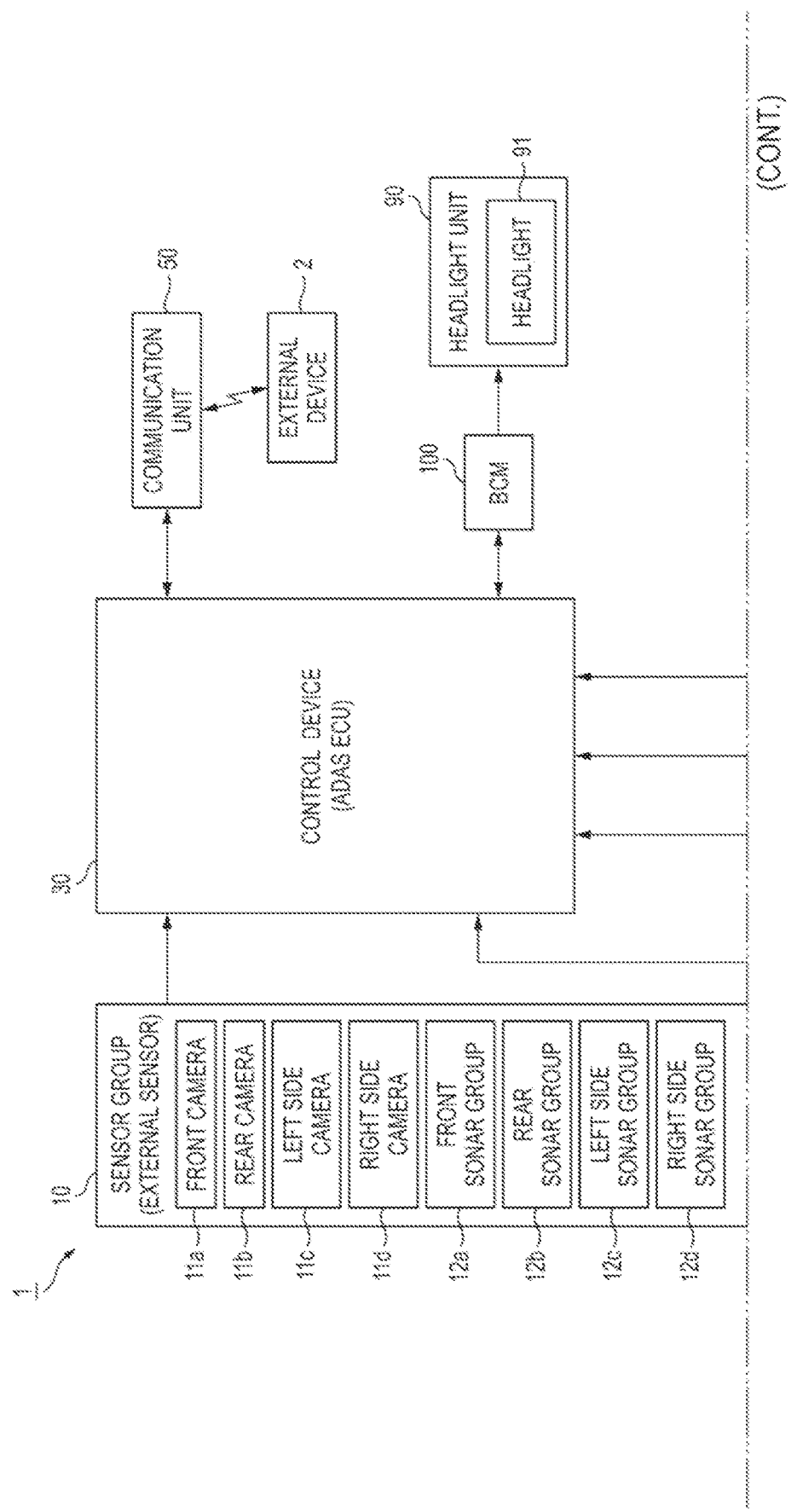
FIG. 10 is a block diagram showing a schematic configuration of a vehicle according to another embodiment.

The control device 30 is mounted on the vehicle 1, is communicably connected to other devices mounted on the vehicle 1, and integrally controls the entire vehicle 1 by communicating with the other devices. The control device 30 is implemented by, for example, an ECU including a processor that executes various calculations, a storage device having a non-transitory storage medium that stores various types of information, an input and output device that controls input and output of data between the inside and the outside of the control device 30, and the like. The control device 30 may be implemented by a single ECU, or may be implemented by a plurality of ECUs (for example, see FIG. 10). The control device 30 will be described later again.

Examples of the other devices connected to the control device 30 (hereinafter, also simply referred to as the "other devices") include the cameras, sonar groups, and sensors included in the sensor group 10, an EPS ECU 45 of the EPS system 40, a driving ECU 61 of the driving force control system 60, and a braking ECU 71 of the braking force control system 70. The EPS ECU 45, the driving ECU 61, and the braking ECU 71 will be described later.

The control device 30 is connected to the other devices via, for example, a wired communication network implemented by various wire harnesses, cables, connectors, and the like routed in the vehicle 1. For example, a controller area network (CAN), a local interconnect network (LIN), a FlexRay, or a CAN wide flexible data rate (CAN FD) can be adopted for communication between the control device 30 and the other devices.

The EPS system 40 includes a steering angle sensor 41, a torque sensor 42, an EPS motor 43, a resolver 44, and the EPS electronic control unit (EPS ECU) 45. The steering angle sensor 41 detects a steering angle θst of a steering wheel 46. The torque sensor 42 detects a torque TQ applied to the steering wheel 46.

For example, during lane keeping assistance control described above, the EPS motor 43 can assist a steering operation of the user (for example, a driver of the vehicle 1) by applying a driving force or a reaction force to a steering column 47 coupled to the steering wheel 46. The resolver 44 detects a rotation angle θm of the EPS motor 43. The EPS ECU 45 controls the entire EPS system 40.

The driving force control system 60 includes the driving ECU 61. The driving force control system 60 executes driving force control of the vehicle 1. For example, the driving ECU 61 controls a driving force of the vehicle 1 by controlling an engine (not shown) or the like in response to an operation of the user on an accelerator pedal (not shown). During autonomous movement control described above, the driving ECU 61 may control the driving force of the vehicle 1 such that the vehicle 1 travels at a predetermined speed.

The braking force control system 70 includes the braking ECU 71. The braking force control system 70 executes braking force control of the vehicle 1. The braking ECU 71 controls a braking force of the vehicle 1 by controlling a brake mechanism (not shown) or the like in response to an operation of the user operation on a brake pedal (not shown). During the autonomous movement control described above, the braking ECU 71 may appropriately control the brake mechanism to decelerate or stop the vehicle 1.

The communication unit 50 is a communication interface that communicates with an external device 2 outside the vehicle 1 under control of the control device 30. That is, the control device 30 can communicate with the external device 2 via the communication unit 50. For example, a mobile communication network such as a cellular line, Wi-Fi (registered trademark), or Bluetooth (registered trademark) can be adopted for communication between the vehicle 1 and the external device 2. The external device 2 is managed by, for example, a manufacturer of the vehicle 1. The external device 2 may be a virtual server (cloud server) implemented in a cloud computing service, or may be a physical server implemented as a single device.

The headlight unit 90 includes a headlight 91 that is a light body attached to a front end portion of a vehicle body of the vehicle 1 to illuminate ahead of the vehicle 1, a headlight driving circuit (not shown) that drives the headlight 91 under the control of the control device 30, and the like. The headlight 91 is switchable between a first state called a "low beam" and a second state called a "high beam" in which a distance farther than that in the first state can be illuminated when the headlight 91 is turned on. The headlight driving circuit turns on and off the headlight 91, switches the headlight 91 between the low beam and the high beam, and the like under the control of the control device 30.

[Control Device]

Next, an example of the control device 30 will be described in detail.

For example, when another vehicle such as an oncoming vehicle that is overtaking is present, the vehicle 1 executes an out-of-vehicle notification to notify the other vehicle of presence of the host vehicle. Accordingly, it is possible to inform a driver of the other vehicle of the presence of the host vehicle, and thus to improve safety of the vehicle 1. The out-of-vehicle notification may be, for example, headlight flashing in which the headlight 91 is switched between the low beam and the high beam at a predetermined cycle (for example, a cycle of one second). When the out-of-vehicle notification is headlight hashing, it is possible to notify the driver of the other vehicle of the presence of the host vehicle in an intuitive and easy-to-understand manner without adding a notification device dedicated to the out-of-vehicle notification to the vehicle 1.

If the out-of-vehicle notification using the headlight 91 is executed regardless of a distance between the host vehicle and the other vehicle, a situation may occur in which an avoidance operation (for example, deceleration or steering for returning to an opposite lane) by the driver of the other vehicle may be rather hindered. For example, when the out-of-vehicle notification using the headlight 91 is executed on the other vehicle approaching the host vehicle, the driver of the other vehicle may be dazzled, and the avoidance operation by the driver of the other vehicle may be hindered.

Therefore, the control device 30 determines presence or absence of another vehicle that may collide with the host vehicle based on the surrounding information on the vehicle 1, and when the other vehicle is present, the control device 30 executes the out-of-vehicle notification using the headlight 91 according to the distance between the host vehicle and the other vehicle. Accordingly, when the other vehicle is away from the host vehicle to some extent, a driver of the other vehicle can be prompted to perform the avoidance operation by being notified of presence of the host vehicle through the out-of-vehicle notification. On the other hand, when the other vehicle is approaching the host vehicle, the out-of-vehicle notification is not executed, so that it can be avoided that the driver of the other vehicle is dazzled by the out-of-vehicle notification and the avoidance operation is hindered. Therefore, the out-of-vehicle notification using the headlight 91 can be appropriately executed.

In recent years, from a viewpoint of safety improvement, automatic illumination switching control called an "auto-high beam", which automatically switches a headlight between a low beam and a high beam, may be implemented in an automobile such as the vehicle 1. In general, the user can switch between execution (in other words, an on state)

and non-execution (in other words, an off state) in such automatic illumination switching control, but it is desirable that the out-of-vehicle notification described above would be appropriately executed as necessary regardless of whether the automatic illumination switching control is on or off.

Therefore, the control device 30 appropriately executes the out-of-vehicle notification as necessary in both a case where the automatic illumination switching control is executed in response to a request from the user and a case where the automatic illumination switching control is not executed in response to a request from the user. Accordingly, even when the automatic illumination switching control is set not to be executed in response to a request from the user, the out-of-vehicle notification using the headlight 91 can be appropriately executed.

Specifically, the control device 30 serves as, for example, a functional unit implemented by a processor executing a program stored in a storage device of the control device 30 or a functional unit implemented by an input and output device of the control device 30, and includes a detection unit 31 and a processing unit 32.

The detection unit 31 detects another vehicle present around the vehicle 1 or detects a distance between the host vehicle and the other vehicle present around the vehicle 1 based on various detection values related to the vehicle 1 or the surroundings of the vehicle 1 acquired by the sensor group 10, that is, the surrounding information. Then, the detection unit 31 passes a detection result to the processing unit 32.

The processing unit 32 detects another vehicle whose traveling direction is opposite to a traveling direction of the vehicle 1 and that may collide with the vehicle 1, based on the detection result of the detection unit 31. Here, the other vehicle that may collide with the vehicle 1 is, for example, the vehicle whose distance from the vehicle 1 is equal to or smaller than a threshold (for example, a first threshold d1 to be described later). The other vehicle that may collide with the vehicle 1 may be the vehicle whose time to collision (TTC) is equal to or smaller than a threshold. The TTC can be obtained by dividing a distance between the vehicle 1 and the other vehicle by a relative speed between the vehicle 1 and the other vehicle.

Hereinafter, the other vehicle whose traveling direction is opposite to the traveling direction of the vehicle 1 and that may collide with the vehicle 1 is also referred to as an "out-of-vehicle notification target vehicle". When the out-of-vehicle notification target vehicle is detected, the processing unit 32 executes the out-of-vehicle notification using the headlight 91 based on the distance between the vehicle 1 and the out-of-vehicle notification target vehicle (details will be described later).

The processing unit 32 also executes the automatic illumination switching control for switching the headlight 91 between the low beam (that is, a first state) and the high beam (that is, a second state) in response to a request from the user (for example, a driver) of the vehicle 1.

For example, the request from the user may be a predetermined operation performed using the operation input unit 80, the touch panel 21, or the like. Then, for example, the processing unit 32 does not execute the automatic illumination switching control when there is an operation of not executing the automatic illumination switching control (in other words, the off state), and executes the automatic illumination switching control when there is no such operation (that is, in a default state). An operation on the operation input unit 80, the touch panel 21, or the like can be detected based on a signal output from these to the control device 30.

When the automatic illumination switching control is executed, the processing unit 32 detects another vehicle in front of the vehicle 1 based on the detection result of the detection unit 31. When the other vehicle in front of the vehicle 1 is detected, the processing unit 32 sets the headlight 91 to the low beam, and when no other vehicle in front of the vehicle 1 is detected, the processing unit 32 sets the headlight 91 to the high beam (details will be described later).

[Specific Example of Controlling Headlight by Control Device]

Figure 2:
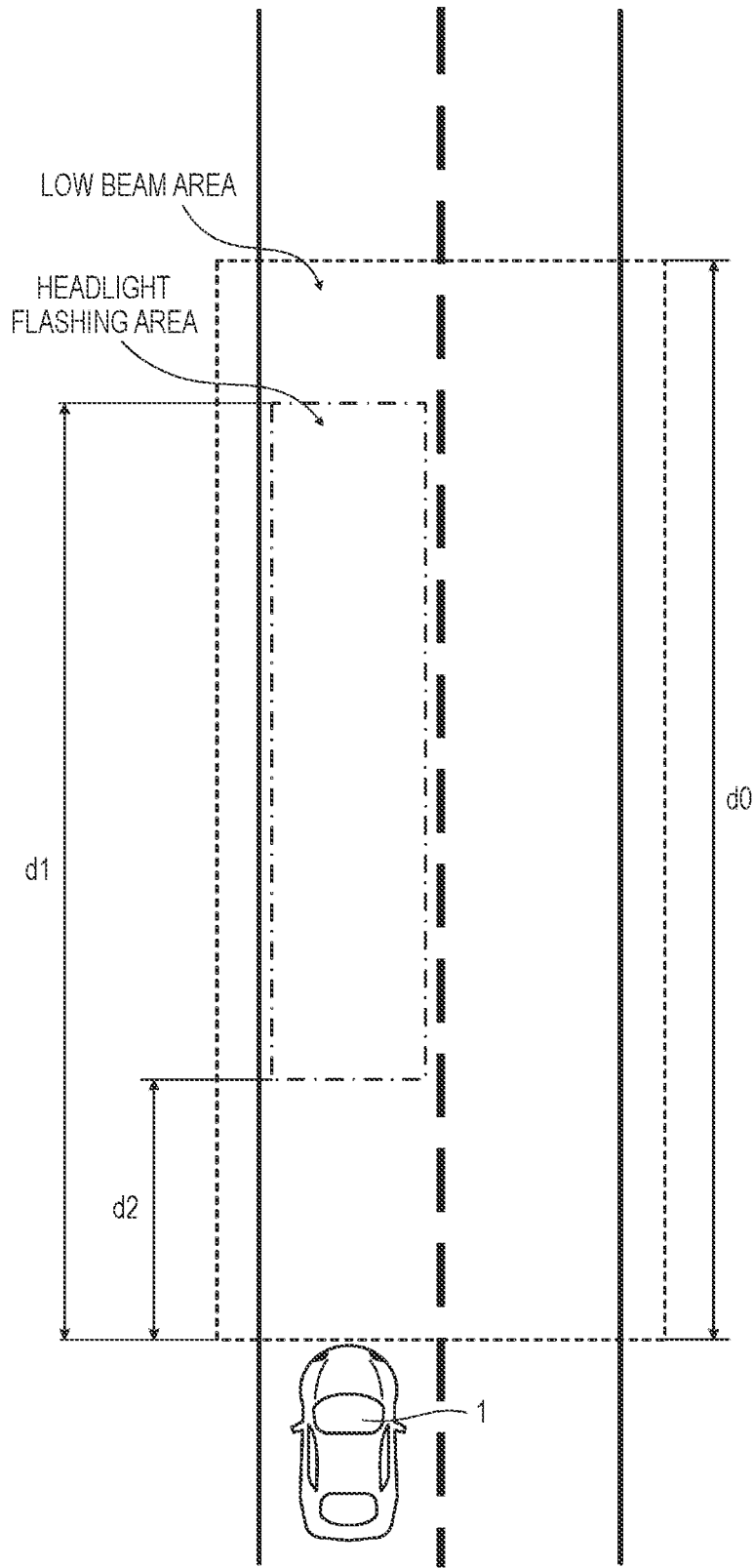
FIG. 2 is a conceptual diagram showing a low beam area and a headlight flashing area.

Next, a specific example of controlling the headlight 91 by the control device 30 will be described. FIG. 2 is a conceptual diagram showing a low beam area that is a condition for setting the headlight 91 to the low beam and a headlight flashing area that is a condition for performing headlight flashing as the out-of-vehicle notification when the automatic illumination switching control is executed.

Figure 3:
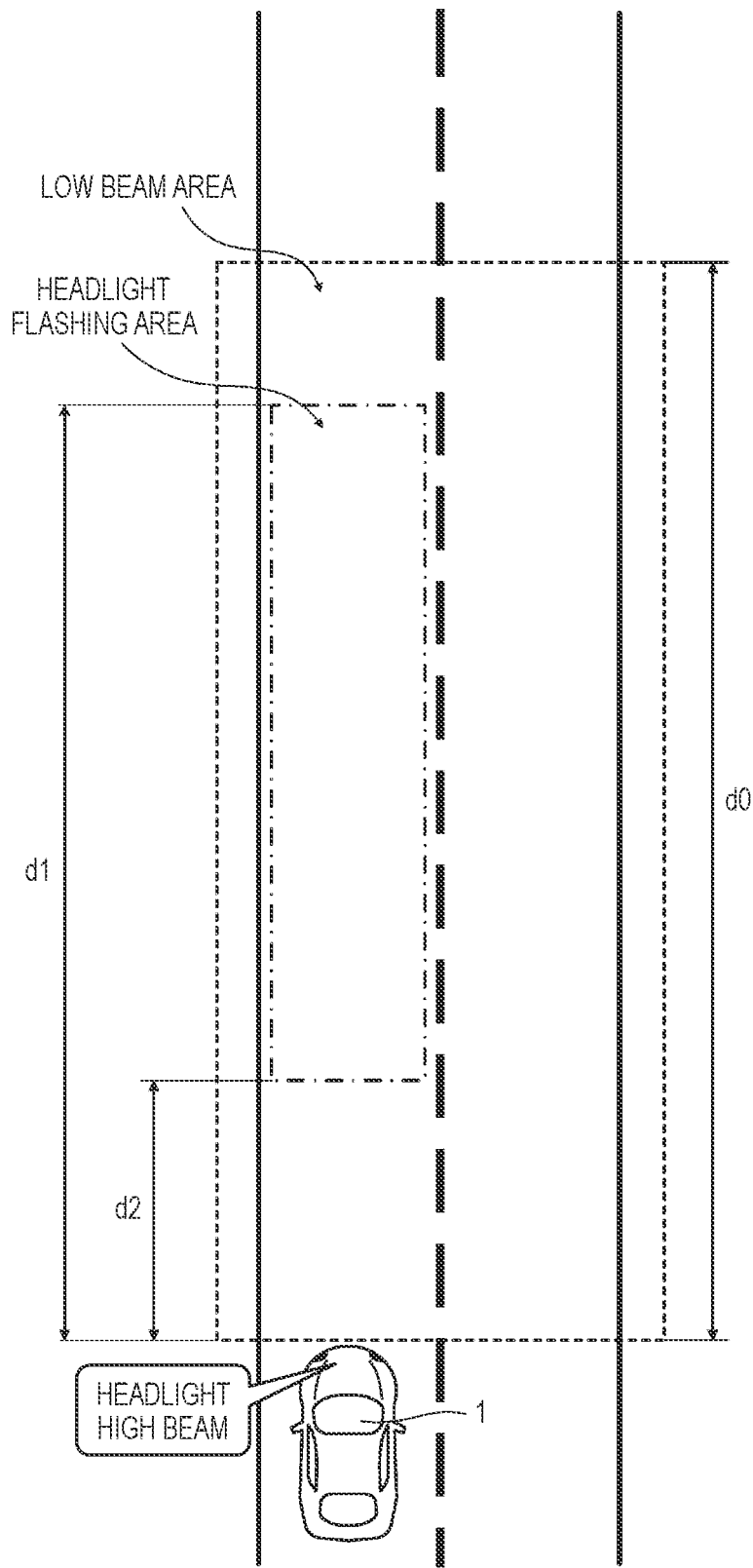
FIG. 3 is a conceptual diagram showing the low beam area where a headlight emits a low beam, a high beam area where the headlight emits a high beam, and the headlight flashing area where headlight flashing is performed.

That is, during execution of the automatic illumination switching control, when no other vehicle is detected within a predetermined distance d0 in front of the vehicle 1 (host vehicle), the processing unit 32 sets the headlight 91 to the high beam (also see FIG. 3). On the other hand, when another vehicle is detected within the predetermined distance d0, the processing unit 32 sets the headlight 91 to the low beam (also see FIG. 4).

Figure 5:
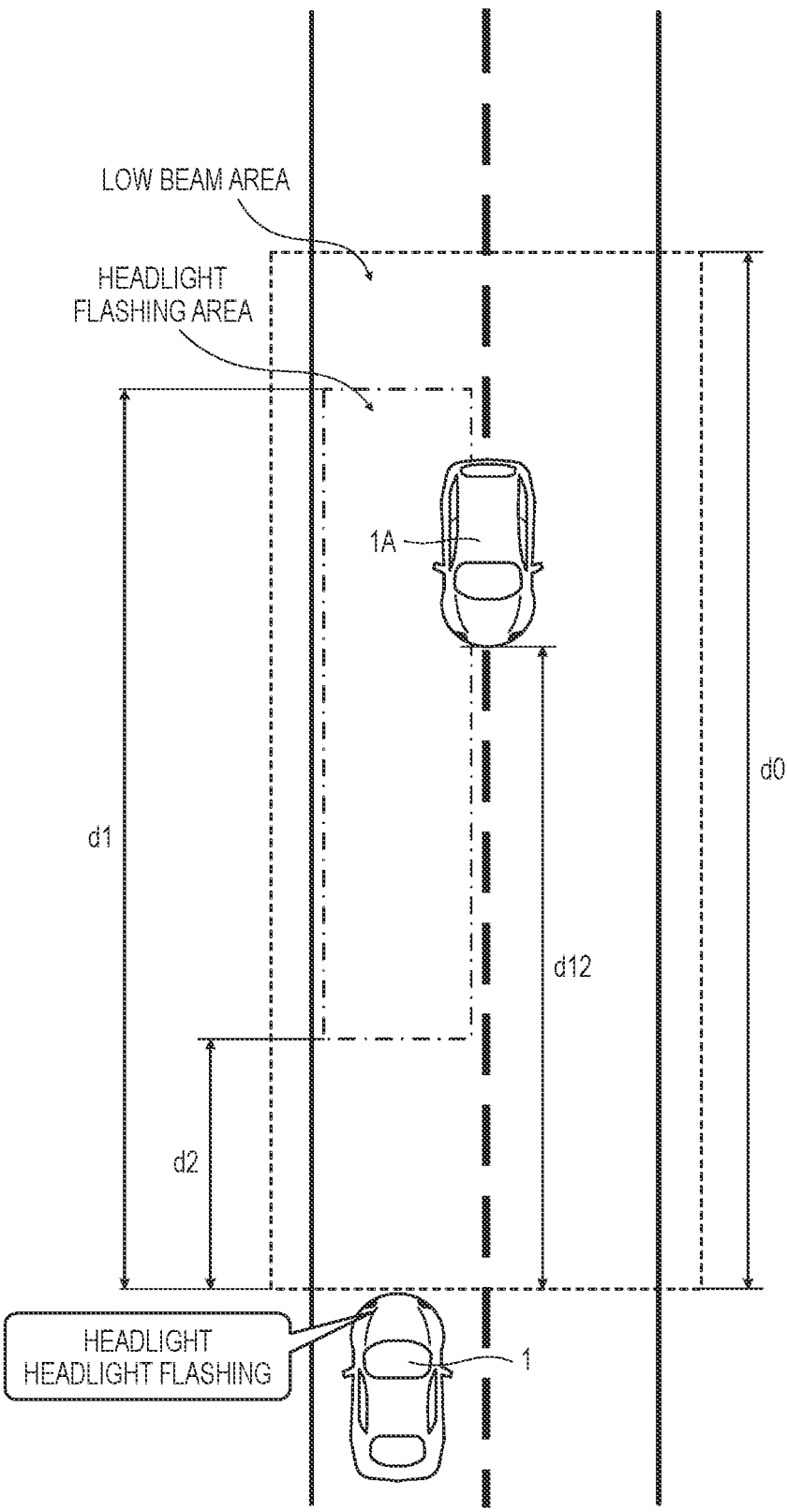
FIG. 5 is a conceptual diagram showing a surrounding situation in which another vehicle is present within a predetermined distance in front of the host vehicle and at least a part of the other vehicle enters a travel lane of the host vehicle.

When the out-of-vehicle notification target vehicle is detected and the distance between the vehicle 1 and the out-of-vehicle notification target vehicle is equal to or smaller than the first threshold d1 and equal to or larger than a second threshold d2 that is smaller than the first threshold d1, the processing unit 32 controls the headlight 91 to execute the out-of-vehicle notification (that is, headlight flashing) (also see FIG. 5). On the other hand, when the out-of-vehicle notification target vehicle is detected and the distance between the vehicle 1 and the out-of-vehicle notification target vehicle is smaller than the second threshold d2, the processing unit 32 does not execute the out-of-vehicle notification (also see FIG. 6).

Hereinafter, an example of controlling the headlight 91 by the control device 30 will be described in more detail with reference to FIGS. 3 to 6.

FIG. 3 is a conceptual diagram showing a surrounding situation in which no other vehicle is present in front of the vehicle 1 or a distance between the vehicle 1 and the other vehicle is larger than the predetermined distance d0. In such a situation, it is preferable for the driver of the vehicle 1 to set the headlight 91 to the high beam from a viewpoint of ensuring the field of view, and driving of a driver of the other vehicle is less likely to be hindered even when the headlight 91 is set to the high beam. Therefore, when the surrounding information indicating such a surrounding situation is acquired during execution of the automatic illumination switching control, the processing unit 32 sets the headlight 91 to the high beam.

Figure 4:
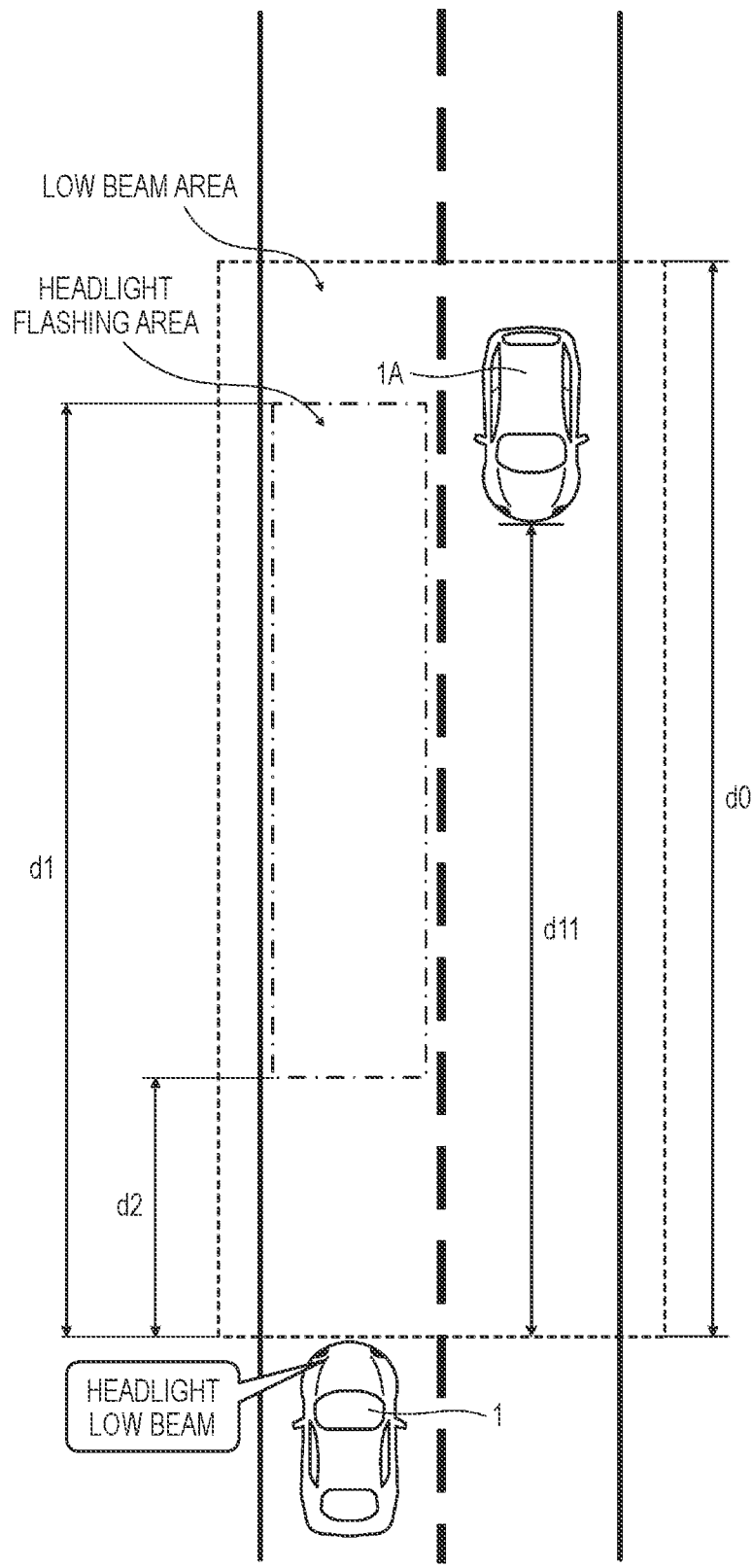
FIG. 4 is a conceptual diagram showing a surrounding situation in which another vehicle is present within a predetermined distance in front of the host vehicle but does not enter a travel lane of the host vehicle.

FIG. 4 is a conceptual diagram showing a surrounding situation in which the other vehicle 1A whose traveling direction is opposite to a traveling direction of the host vehicle is present in front of the vehicle 1 and a distance between the vehicle 1 and the other vehicle 1A is d11, which is equal to or smaller than the predetermined distance d0. In the example shown in FIG. 4, it is assumed that the other vehicle 1A does not enter a travel lane on which the vehicle 1 travels. In such a situation, it is preferable to set the headlight 91 to the low beam from a viewpoint of preventing the driver of the other vehicle 1A from being dazzled. Therefore, when the surrounding information indicating such a surrounding situation is acquired during execution of the automatic illumination switching control, the processing unit 32 sets the headlight 91 to the low beam.

FIG. 5 is a conceptual diagram showing a surrounding situation in which the other vehicle 1A whose traveling direction is opposite to a traveling direction of the host vehicle is present in front of the vehicle 1 and a distance between the vehicle 1 and the other vehicle 1A is d12, which is equal to or smaller than the predetermined distance d0. In the example shown in FIG. 5, it is assumed that the other vehicle 1A enters a travel lane on which the vehicle 1 travels. Further, in the example shown in FIG. 5, it is assumed that the distance d12 between the vehicle 1 and the other vehicle 1A is equal to or smaller than the first threshold d1 and equal to or larger than the second threshold d2. In such a situation, the other vehicle 1A that enters the travel lane on which the vehicle 1 travels may collide with the vehicle 1.

Therefore, when the surrounding information indicating the surrounding situation as shown in FIG. 5 is acquired during execution of the automatic illumination switching control the processing unit 32 detects the other vehicle 1A as the out-of-vehicle notification target vehicle. Then, the processing unit 32 executes the out-of-vehicle notification for causing the headlight 91 to perform headlight flashing, and notifies the driver of the other vehicle 1A of presence of the vehicle 1. Accordingly, it is possible to prompt the driver of the other vehicle 1A to perform the avoidance operation, and thus to improve the safety of the vehicle 1.

Even when the automatic illumination switching control is not executed, in a case where the surrounding information indicating the surrounding situation as shown in FIG. 5 is acquired, the processing unit 32 detects the other vehicle 1A as the out-of-vehicle notification target vehicle, executes the out-of-vehicle notification for causing the headlight 91 to perform headlight flashing, and notifies the driver of the other vehicle 1A of the presence of the vehicle 1. Accordingly, even when the automatic illumination switching control is set not to be executed in response to a request from the user, the out-of-vehicle notification using the headlight 91 can be appropriately executed.

Figure 6:
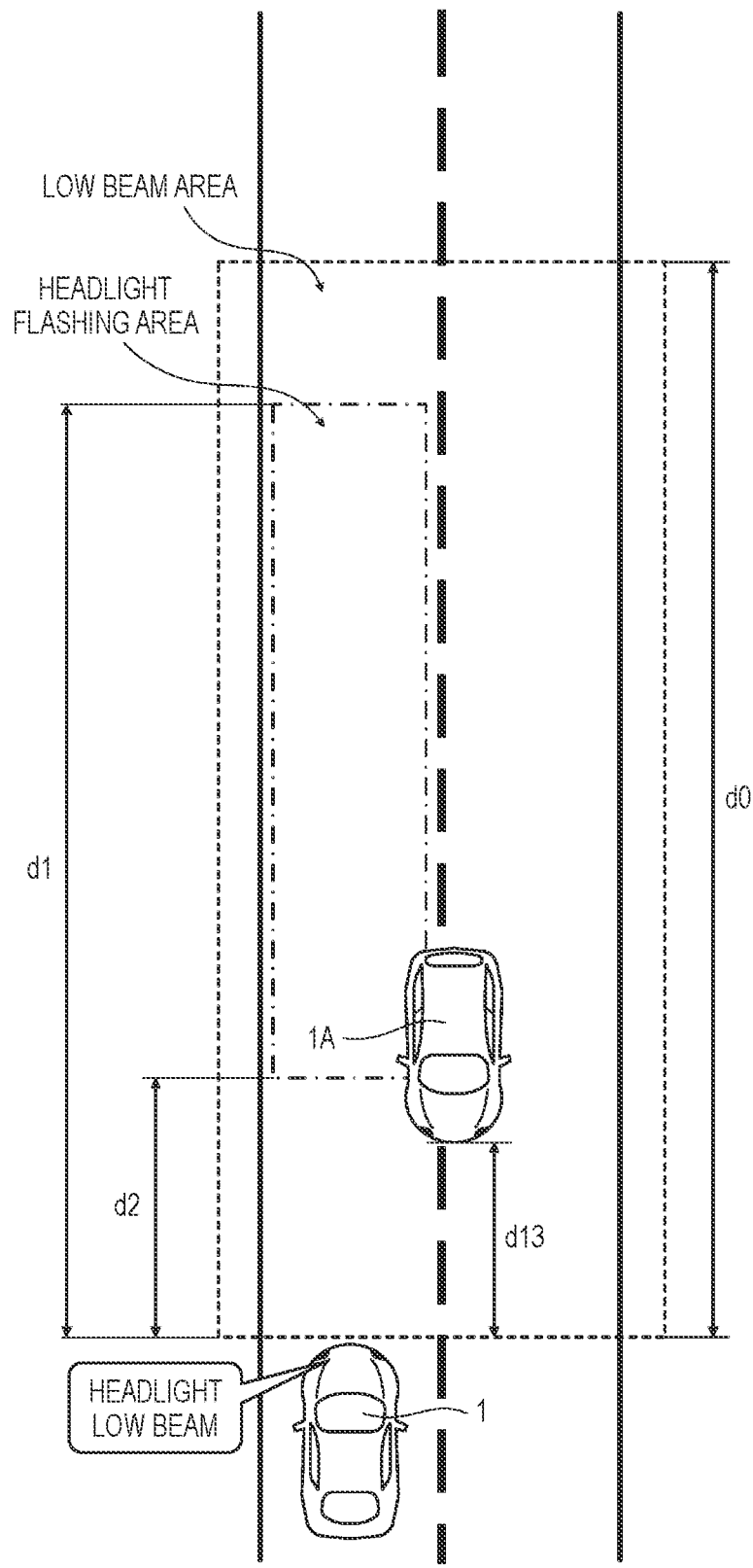
FIG. 6 is a conceptual diagram showing a surrounding situation in which another vehicle is present within a predetermined distance in front of the host vehicle, at least a part of the other vehicle enters a travel lane of the host vehicle, and a distance between the host vehicle and the other vehicle is smaller than a second threshold.

FIG. 6 is a conceptual diagram showing a surrounding situation in which the other vehicle 1A whose traveling direction is opposite to a traveling direction of the host vehicle is present in front of the vehicle 1 and a distance between the vehicle 1 and the other vehicle 1A is d13, which is equal to or smaller than the predetermined distance d0. In the example shown in FIG. 6, it is assumed that the other vehicle 1A enters the travel lane on which the vehicle 1 travels. Further, in the example shown in FIG. 6, it is assumed that the distance d13 between the vehicle 1 and the other vehicle 1A is equal to or smaller than the second threshold d2. In such a situation, when the headlight 91 is set to the high beam (including headlight flashing), the driver of the other vehicle 1A may be dazzled, and the avoidance operation by the driver of the other vehicle 1A may be rather hindered.

Therefore, when the surrounding information indicating the surrounding situation as shown in FIG. 6 is acquired during execution of the automatic illumination switching control, the processing unit 32 detects the other vehicle 1A as the out-of-vehicle notification target vehicle, but does not execute the out-of-vehicle notification, and sets the headlight 91 to the low beam, for example. Accordingly, it is possible to avoid a situation in which the driver of the other vehicle 1A is dazzled by the high beam of the headlight 91 and the avoidance operation is hindered, and thus to improve the safety of the vehicle 1. When the surrounding information indicating such a surrounding situation is acquired, the processing unit 32 may control the headlight 91 so as to execute the out-of-vehicle notification with a notification intensity lower than usual (for example, in a case of FIG. 5). Here, the out-of-vehicle notification with a lowered notification intensity is a notification that does not dazzle the driver of the other vehicle 1A, and includes, for example, headlight flashing for an extremely short time or headlight flashing with a lowered light intensity, and is not particularly limited thereto.

Even when the automatic illumination switching control is not executed, the processing unit 32 does not execute the out-of-vehicle notification in a case where the surrounding information indicating the surrounding situation as shown in FIG. 6 is acquired. Also in this case, the processing unit 32 may control the headlight 91 so as to execute the out-of-vehicle notification with the notification intensity lower than normal (for example, in the case of FIG. 5).

[Example of Processing Executed by Control Device]

Next, an example of processing executed by the control device 30 will be described with reference to FIGS. 7 to 9. For example, the control device 30 repeatedly executes a series of pieces of processing shown in FIG. 7 at a predetermined cycle while the vehicle 1 is being started (for example, while an ignition power supply is turned on).

Figure 7:
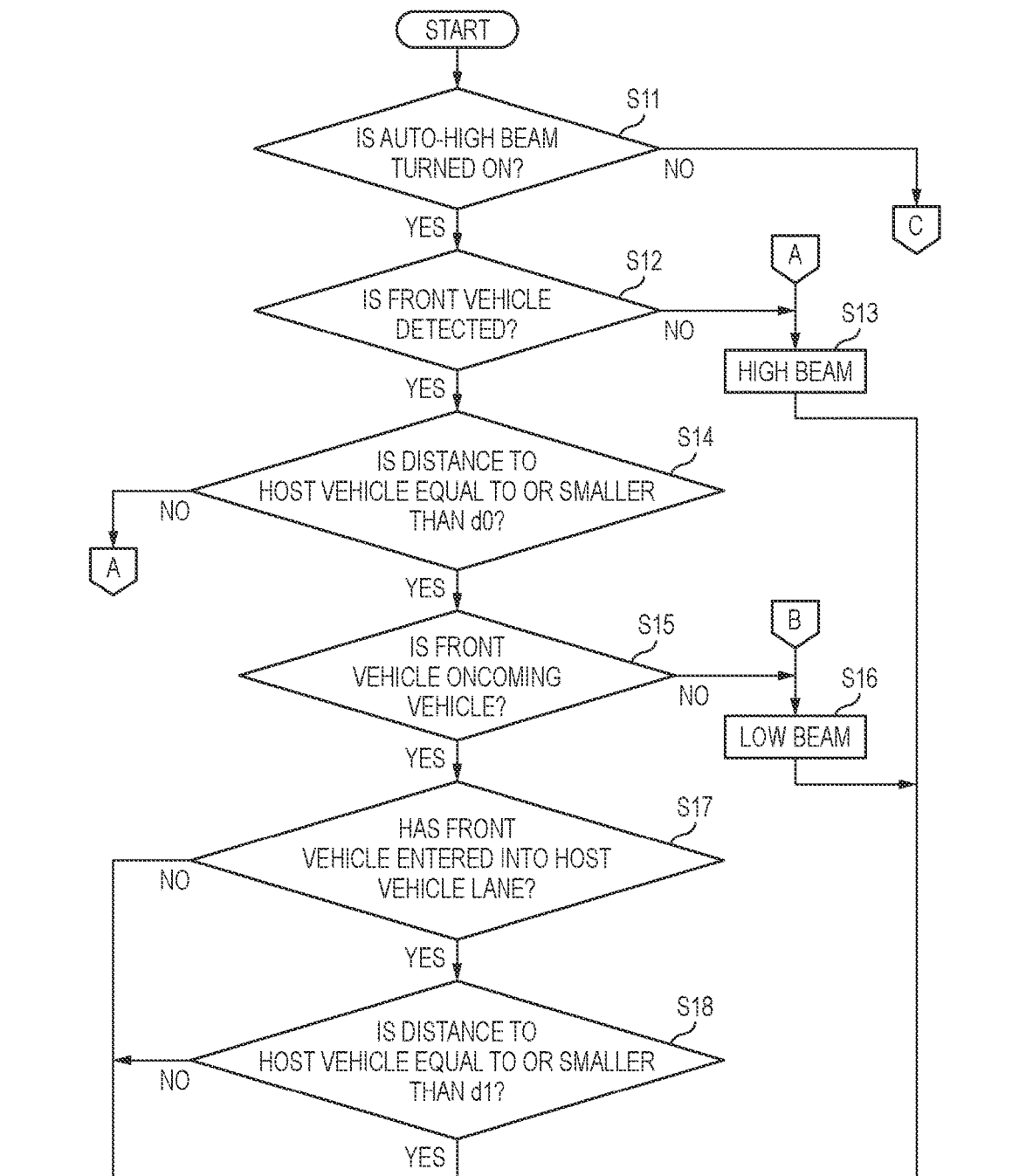
FIG. 7 is a flowchart (part 1) showing an example of processing executed by a control device according to the embodiment.

As shown in FIG. 7, the control device 30 (for example, the processing unit 32) determines whether an auto-high beam is turned on, that is, whether the automatic illumination switching control is being executed (step S11). When the auto-high beam is turned off (step S11; No), that is, when the automatic illumination switching control is not being executed (that is, non-execution), the control device 30 proceeds to the processing of step S22 shown in FIG. 8 (to be described later).

When the auto-high beam is turned on, that is, when the automatic illumination switching control is being executed (step S11; Yes), the control device 30 determines whether another vehicle is detected in front of the host vehicle based on the surrounding information (step S12). When no other vehicle is detected (step S12; No), the control device 30 sets the headlight 91 to the high beam (step S13).

When the other vehicle is detected in front of the host vehicle (step S12, Yes), the control device 30 determines whether a distance between the host vehicle and the other vehicle is equal to or smaller than the predetermined distance d0 (step S14). When the distance between the host vehicle and the other vehicle is larger than the predetermined distance d0 (step S14; No), the control device 30 sets the headlight 91 to the high beam (step S13).

When the distance between the host vehicle and the other vehicle is equal to or smaller than the predetermined distance d0 (step S14; Yes), the control device 30 determines whether the other vehicle in front is an oncoming vehicle (step S15). In this determination, for example, it is determined whether a traveling direction of the other vehicle is opposite to a traveling direction of the host vehicle (that is, whether the other vehicle is the oncoming vehicle) based on a change in the distance between the host vehicle and the other vehicle. When the other vehicle in front is not the oncoming vehicle (step S15; No), the control device 30 sets the headlight 91 to the low beam (step S16).

When the other vehicle in front is the oncoming vehicle (step S15; Yes), the control device 30 determines whether the other vehicle (that is, the oncoming vehicle) has entered into a travel lane of the host vehicle (step S17). In this determination, for example, it is determined whether at least a part of the other vehicle enters the travel lane of the host vehicle based on the surrounding information. That is, the other vehicle whose traveling direction is opposite to the traveling direction of the host vehicle and at least a part of which enters the travel lane of the host vehicle is highly likely to collide with the host vehicle. Therefore, according to this determination, in step S21 to be described later, the out-of-vehicle notification can be executed on the other vehicle that is highly likely to collide with the host vehicle.

When the other vehicle (that is, the oncoming vehicle) has not entered into the travel lane of the host vehicle (step S17; No), the control device 30 sets the headlight 91 to the low beam (step S16). On the other hand, when the other vehicle has entered into the travel lane of the host vehicle (step S17; Yes), the control device 30 determines whether a distance between the host vehicle and the other vehicle is equal to or smaller than the first threshold d1 (step S18). When the distance between the host vehicle and the other vehicle is larger than the first threshold d1 (step S18; No), the control device 30 sets the headlight 91 to the low beam (step S16).

When the distance between the host vehicle and the other vehicle is equal to or smaller than the first threshold d1 (step S18; Yes), the control device 30 determines whether the distance between the host vehicle and the other vehicle is equal to or larger than the second threshold d2 (step S19). When the distance between the host vehicle and the other vehicle is smaller than the second threshold d2 (step S19; No), the control device 30 sets the headlight 91 to the low beam (step S16).

When the distance between the host vehicle and the other vehicle is equal to or larger than the second threshold d2 (step S19; Yes), the control device 30 determines whether another condition related to the out-of-vehicle notification is also satisfied on a premise of execution of the out-of-vehicle notification in step S21 to be described below (step S20). When the other condition is not satisfied (step S20; No), the control device 30 does not execute the out-of-vehicle notification, and sets the headlight 91 to the low beam (step S16). A specific example of the other condition used in the processing of step S20 will be described later.

When the other condition is satisfied (step S20; Yes), the control device 30 causes the headlight 91 to execute the out-of-vehicle notification, that is, headlight flashing (step S21). That is, when the distance between the host vehicle and the other vehicle is equal to or smaller than the first threshold d1 and equal to or larger than the second threshold d2, the control device 30 causes the headlight 91 to execute the out-of-vehicle notification. The out-of-vehicle notification may be, for example, headlight flashing in which three sets of switching between the high beam and the low beam are performed.

According to the processing of this flowchart, when the other vehicle whose traveling direction is opposite to the traveling direction of the host vehicle and that may collide with the host vehicle is detected in front of the host vehicle (steps S12 to S17) and the distance between the host vehicle and the other vehicle is equal to or smaller than the first threshold and equal to or larger than the second threshold, it is possible to prompt the driver of the other vehicle to perform the avoidance operation by the out-of-vehicle notification using the headlight 91 (steps S18 to S21).

On the other hand, if the out-of-vehicle notification using the headlight 91 is executed even when the distance between the host vehicle and the other vehicle is smaller than the second threshold, the driver of the other vehicle may be dazzled and the avoidance operation by the driver of the other vehicle may be hindered. Therefore, when the distance between the host vehicle and the other vehicle is smaller than the second threshold, the out-of-vehicle notification is not executed or the notification intensity of the out-of-vehicle notification is lowered, whereby it is possible to prevent the avoidance operation by the driver of the other vehicle from being hindered by being dazzled due to the out-of-vehicle notification (step S19; No). Therefore, it is possible to appropriately execute the out-of-vehicle notification, and thus to improve the safety of the vehicle 1. Here, it is determined whether to execute the out-of-vehicle notification based on the distance between the host vehicle and the other vehicle, but the present invention is not limited thereto. For example, it may be determined whether to execute the out-of-vehicle notification based on the TTC described above instead of the distance between the host vehicle and the other vehicle.

The other condition in step S20 includes, but is not particularly limited to, the following conditions 1) to 3).

1) Curvature of Road

The control device 30 (for example, the processing unit 32) determines whether a curvature of a road on which the host vehicle travels is equal to or larger than a predetermined value based on information of a map information database stored in the navigation device 20, or the like. When the curvature of the road is equal to or larger than the predetermined value, the control device 30 causes the headlight 91 to execute the out-of-vehicle notification based on the distance between the host vehicle and the other vehicle.

That is, when the curvature of the road on which the vehicle 1 travels is smaller than the predetermined value, detection accuracy of the other vehicle whose traveling direction is opposite to the traveling direction of the host vehicle and that may collide with the host vehicle may decrease. According to this condition, since the control device 30 (for example, the processing unit 32) causes the headlight 91 to execute the out-of-vehicle notification based on a fact that the curvature of the road on which the vehicle 1 travels is equal to or larger than the predetermined value, it is possible to prevent the out-of-vehicle notification from being executed in a situation in which no other vehicle that may collide with the host vehicle is actually present.

2) Travel Speed of Host Vehicle

The control device 30 (for example, the processing unit 32) determines whether a travel speed of the host vehicle is equal to or larger than a predetermined value based on vehicle speed information from the vehicle speed sensor 14, or the like. When the travel speed of the host vehicle is equal to or larger than the predetermined value, the control device 30 causes the headlight 91 to execute the out-of-vehicle notification based on the distance between the host vehicle and the other vehicle.

When the travel speed of the host vehicle is smaller than the predetermined value, such as when the vehicle 1 is stopped, a possibility of collision between the host vehicle and the other vehicle is relatively lower than when the travel speed of the host vehicle is equal to or larger than the predetermined value. According to this condition, since the control device 30 (for example, the processing unit 32) executes the out-of-vehicle notification based on a fact that the travel speed of the host vehicle is equal to or larger than the predetermined value, it is possible to prevent the out-of-vehicle notification from being executed in a situation in which the other vehicle is less likely to collide with the host vehicle.

3) Travel Speed of Other Vehicle

The control device 30 (for example, the processing unit 32) determines whether a travel speed of the other vehicle is equal to or larger than a predetermined value based on the surrounding information or the like. When the travel speed of the other vehicle is equal to or larger than the predetermined value, the control device 30 causes the headlight 91 to execute the out-of-vehicle notification based on the distance between the host vehicle and the other vehicle.

When the travel speed of the other vehicle is smaller than the predetermined value, such as when the other vehicle is stopped, a possibility of collision between the host vehicle and the other vehicle is relatively lower than when the travel speed of the other vehicle is equal to or larger than the predetermined value. According to this condition, since the control device 30 (for example, the processing unit 32) executes the out-of-vehicle notification based on a fact that the travel speed of the other vehicle is equal to or larger than the predetermined value, it is possible to prevent the out-of-vehicle notification from being executed in a situation in which the other vehicle is less likely to collide with the host vehicle.

As described with reference to FIG. 2, in the automatic illumination switching control, when no other vehicle is detected within the predetermined distance d0 in front of the vehicle 1, the headlight 91 is set to the high beam (that is, the second state), and when the other vehicle is detected within the predetermined distance d0, the headlight 91 is set to the low beam (that is, the first state). Here, the predetermined distance d0 is set to be larger than the first threshold d1. Accordingly, the automatic illumination switching control that can appropriately control a state of the headlight 91 can be executed according to the distance between the host vehicle and the other vehicle in front of the host vehicle.

In step S11 in FIG. 7, when the auto-high beam is turned off (step S11; No), that is, when the automatic illumination switching control is not being executed (in non-execution), the control device 30 proceeds to the processing of step S22 shown in FIG. 8, and executes the following processing. When the automatic illumination switching control is not being executed, that is, when the auto-high beam is turned off, the control device 30 sets the headlight 91 in a state corresponding to a position of a headlight switch except when the out-of-vehicle notification to be described later is being executed. The headlight switch is included in, for example, the operation input unit 80.

Figure 8:
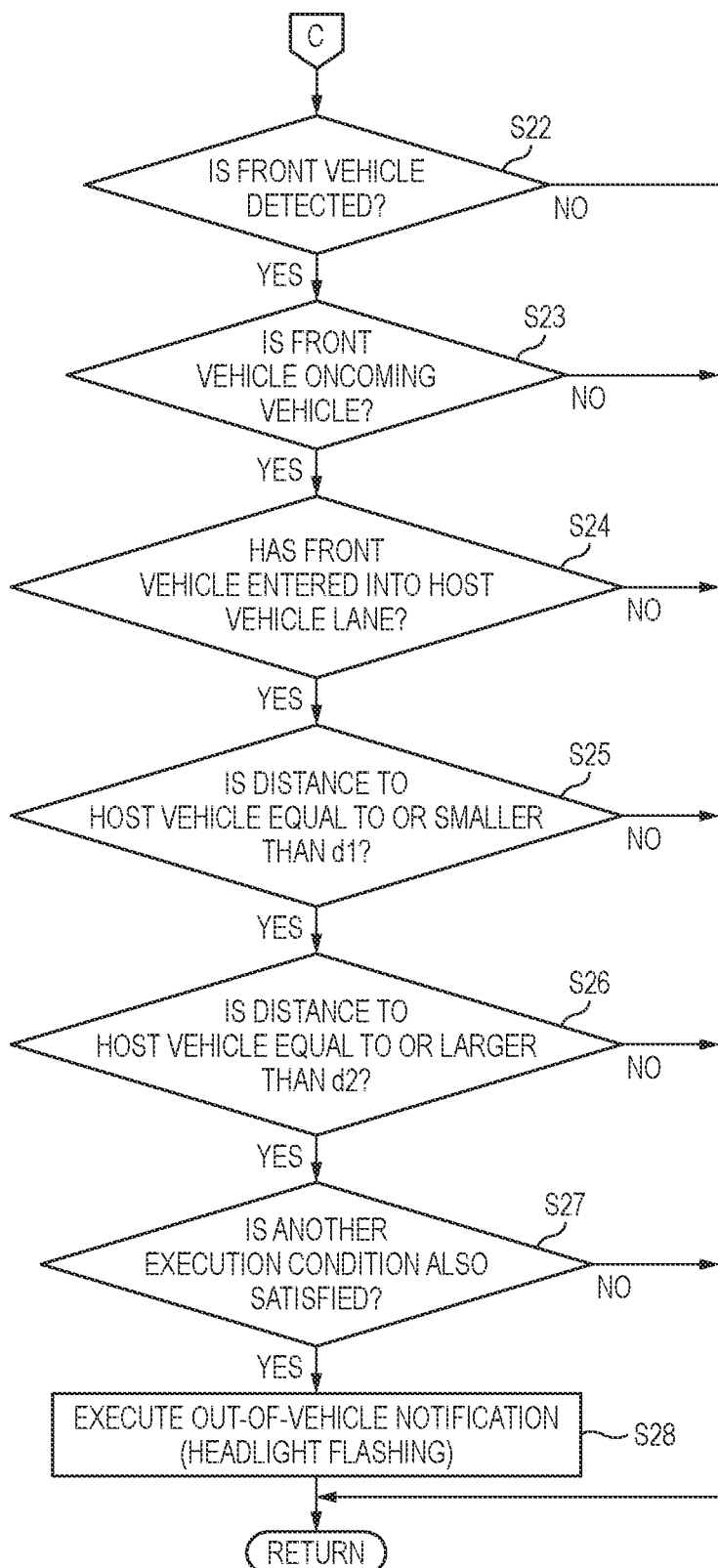
FIG. 8 is a flowchart (part 2) showing the example of processing executed by the control device according to the embodiment.

As shown in FIG. 8, the control device 30 determines whether another vehicle is detected in front of the host vehicle based on the surrounding information (step S22). When no other vehicle is detected (step S22; No), the control device 30 ends a series of pieces of processing shown in FIG. 8.

When the other vehicle is detected in front of the host vehicle (step S22; Yes), the control device 30 determines whether the other vehicle in front is an oncoming vehicle, similarly to the processing of step S15 (step S23). When the other vehicle in front is not the oncoming vehicle (step S23; No), the control device 30 ends the series of pieces of processing shown in FIG. 8.

When the other vehicle in front is the oncoming vehicle (step S23; Yes), the control device 30 determines whether the other vehicle (that is, the oncoming vehicle) has entered into a travel lane of the host vehicle (step S24), similarly to the processing of step S17. When the other vehicle (that is, the oncoming vehicle) has not entered into the travel lane of the host vehicle (step S24; No), the control device 30 ends the series of pieces of processing shown in FIG. 8.

When the other vehicle (that is, the oncoming vehicle) has entered into the travel lane of the host vehicle (step S24; Yes), the control device 30 determines whether a distance between the host vehicle and the other vehicle is equal to or smaller than the first threshold d1 (step S25), similarly to the processing of step S18. When the distance between the host vehicle and the other vehicle is larger than the first threshold d1 (step S25; No), the control device 30 ends the series of pieces of processing shown in FIG. 8.

When the distance between the host vehicle and the other vehicle is equal to or smaller than the first threshold d1 (step S25; Yes), the control device 30 determines whether the distance between the host vehicle and the other vehicle is equal to or larger than the second threshold d2 (step S26), similarly to the processing of step S19. When the distance between the host vehicle and the other vehicle is smaller than the second threshold d2 (step S26; No), the control device 30 ends the series of pieces of processing shown in FIG. 8.

When the distance between the host vehicle and the other vehicle is equal to or larger than the second threshold d2 (step S26; Yes), the control device 30 determines whether another condition related to the out-of-vehicle notification is also satisfied, similarly to the processing of step S20 (step S27). When the other condition is not satisfied (step S27; No), the control device 30 ends the series of pieces of processing shown in FIG. 8.

When the other condition is satisfied (step S27; Yes), the control device 30 causes the headlight 91 to execute the out-of-vehicle notification, that is, headlight flashing (step S28), and ends the series of pieces of processing shown in FIG. 8.

As described above, the control device 30 can execute the out-of-vehicle notification (step S21 in FIG. 7 and step S28 in FIG. 8) in both a case where the automatic illumination switching control is executed (FIG. 7) and a case where the automatic illumination switching control is not executed (FIG. 8). Therefore, in both the case where the automatic illumination switching control is executed and the case where the automatic illumination switching control is not executed, the out-of-vehicle notification can be executed when the other vehicle that may collide with the host vehicle is detected in front of the host-vehicle, and therefore, it is possible to prompt the driver of the other vehicle to perform the avoidance operation, and thus to improve the safety of the vehicle 1.

In the example described above, the same first threshold d1 as in the processing of step S18 in FIG. 7 is used in the processing of step S25, but the present invention is not limited thereto. That is, in the processing of step S25, a first threshold d1' may be used instead of the first threshold d1. That is, the first threshold may vary from a case where the automatic illumination switching control is executed in FIG. 7 to a case where the automatic illumination switching control is not executed in FIG. 8. The plurality of first thresholds are stored in advance in, for example, the storage device of the control device 30. In this case, the first threshold value d1' in the case where the automatic illumination switching control is not executed is set to be smaller than the first threshold value d1 in the case where the automatic illumination switching control is executed, and d2<d1'<d1 is established.

That is, the user who does not desire the automatic illumination switching control has a strong tendency of not desiring the headlight 91 to be in the second state, that is, the high beam. Therefore, the first threshold d1' in the case where the automatic illumination switching control is not executed is set to be smaller than the first threshold d1 in the case where the automatic illumination switching control is executed, whereby the out-of-vehicle notification in which the headlight 91 is temporarily set to the high beam against an intention of the user can be prevented from being executed in a situation in which the other vehicle is less likely to collide with the host vehicle.

Figure 9:
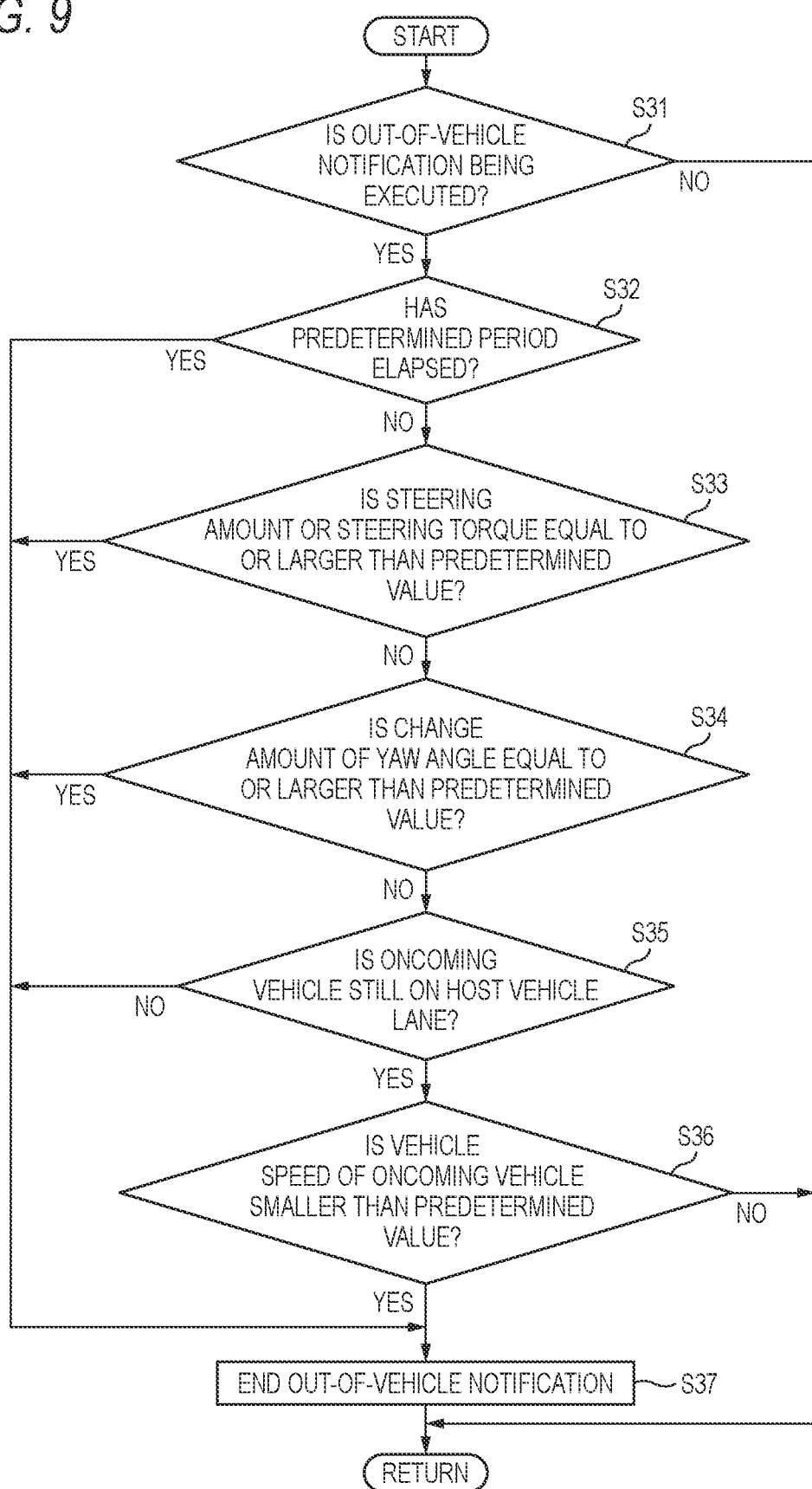
FIG. 9 is a flowchart showing the example of processing executed by the control device according to the embodiment during execution of an out-of-vehicle notification.

FIG. 9 is a flowchart showing an example of processing executed by the control device 30 during execution of the out-of-vehicle notification. As shown in FIG. 9, the control device 30 first determines whether the out-of-vehicle notification is being executed (step S31). When the out-of-vehicle notification is not being executed (step S31; No), a series of pieces of processing shown in FIG. 9 is ended.

When the out-of-vehicle notification is being executed (step S31, Yes), the control device 30 determines whether a predetermined period has elapsed since the out-of-vehicle notification is started (step S32). When the predetermined period has elapsed (step S32; Yes), the control device 30 ends the out-of-vehicle notification (step S37), and ends the series of pieces of processing shown in FIG. 9. Accordingly, when the predetermined period has elapsed since the out-of-vehicle notification is started, the out-of-vehicle notification can be ended, and it is possible to prevent the out-of-vehicle notification from being continuously executed for a long period.

When the predetermined period has not elapsed (step S32; No), the control device 30 determines whether a steering amount or a steering torque of the vehicle 1 is equal to or larger than a predetermined value after the out-of-vehicle notification is started (step S33). The steering amount corresponds to the steering angle θst of the steering wheel 46 detected by the steering angle sensor 41 of the EPS system 40. The steering torque corresponds to the torque TQ applied to the steering wheel 46 detected by the torque sensor 42.

When the steering amount or the steering torque is equal to or larger than the predetermined value (step S33; Yes), the control device 30 ends the out-of-vehicle notification (step S37), and ends the series of pieces of processing shown in FIG. 9. Accordingly, the out-of-vehicle notification can be ended when the steering amount or the steering torque of the host vehicle is equal to or larger than the predetermined value after the out-of-vehicle notification is started, and thus it is possible to prevent the out-of-vehicle notification from being continuously executed even in a situation in which the other vehicle is less likely to collide with the host vehicle due to a direction change of the host vehicle.

When the steering amount or the steering torque is not equal to or larger the predetermined value (step S33; No), the control device 30 determines whether a change amount of a yaw angle of the vehicle 1 from a start of the out-of-vehicle notification is equal to or larger than a predetermined value after the out-of-vehicle notification is started (step S34). The change amount of the yaw angle is an amount of change of a front axle and a rear axle of the vehicle 1 from a reference axis, and can be detected by the inertial measurement unit 15 or can be calculated based on the steering angle θst of the steering wheel 46 detected by the steering angle sensor 41 of the EPS system 40, for example.

When the change amount of the yaw angle is equal to or larger than the predetermined value (step S34; Yes), the control device 30 ends the out-of-vehicle notification (step S37), and ends the series of pieces of processing shown in FIG. 9. Accordingly, the out-of-vehicle notification can be ended when the change amount of the yaw angle of the host vehicle from the start of the out-of-vehicle notification is equal to or larger than the predetermined value after the out-of-vehicle notification is started, and thus it is possible to prevent the out-of-vehicle notification from being continuously executed even in a situation in which the other vehicle is less likely to collide with the host vehicle due to a direction change of the host vehicle.

When the change amount of the yaw angle is not equal to or larger than the predetermined value (step S34; No), the control device 30 determines whether an oncoming vehicle (the other vehicle) has left a travel lane of the host vehicle after the out-of-vehicle notification is started based on the surrounding information (step S35). When the oncoming vehicle has left the travel lane of the host vehicle (step S35; No), the control device 30 ends the out-of-vehicle notification (step S37), and ends the series of pieces of processing shown in FIG. 9. Accordingly, the out-of-vehicle notification can be ended when the other vehicle leaves the travel lane of the host vehicle after the out-of-vehicle notification is started, and thus it is possible to prevent the out-of-vehicle notification from being continuously executed even in a situation in which the other vehicle is less likely to collide with the host vehicle.

When the oncoming vehicle has not left the travel lane of the host vehicle (step S35; Yes), the control device 30 determines whether a travel speed of the other vehicle is smaller than a predetermined value (step S36). When the travel speed of the other vehicle is not smaller than the predetermined value (step S36; No), the control device 30 directly ends the series of pieces of processing shown in FIG. 9.

On the other hand, when the travel speed of the other vehicle is smaller than the predetermined value (step S36; Yes), the control device 30 ends the out-of-vehicle notification (step S37). Accordingly, the out-of-vehicle notification can be ended when the travel speed of the other vehicle is smaller than the predetermined value after the out-of-vehicle notification is started, and thus it is possible to prevent the out-of-vehicle notification from being continuously executed even in a situation in which the other vehicle is less likely to collide with the host vehicle.

Another Embodiment

Next, an example of another embodiment of the control device according to the present invention will be described. The vehicle 1 according to the other embodiment shown in FIG. 10 basically has the same configuration as the vehicle 1 according to the above embodiment shown in FIG. 1, but the control device 30 is implemented by an advanced driving support system electronic control device (ADAS ECU), and further includes a body control module (BCM) 100 that connects the control device 30 and the headlight unit 90. The BCM 100 is an ECU that controls functions of the entire body of the vehicle 1, and can control lighting inside and outside the vehicle, doors, windows, mirrors, wipers, and the like, and this drawing shows that the BCM 100 controls the headlight unit 90 under an instruction of the control device 30.

Figure 11:
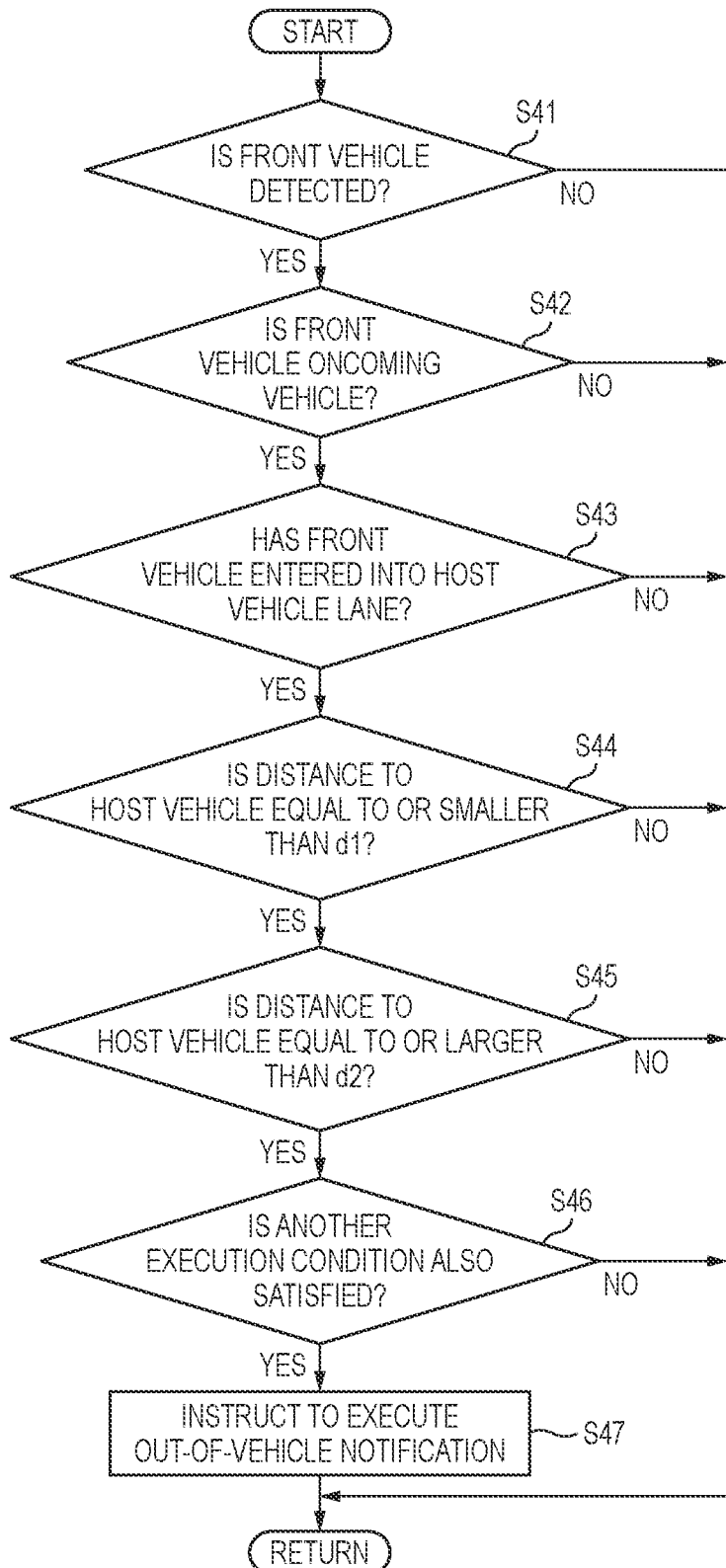
FIG. 11 is a flowchart showing an example of processing executed by a control device according to the other embodiment.

FIG. 11 is a flowchart showing an example of processing executed by the control device 30 according to the other embodiment. For example, the control device 30 according to the present embodiment repeatedly executes a series of pieces of processing shown in FIG. 11 at a predetermined cycle while the vehicle 1 is being started (for example, while the ignition power supply is turned on).

As shown in FIG. 11, the control device 30 determines whether another vehicle is detected in front of the host vehicle based on surrounding information (step S41). When no other vehicle is detected (step S41; No), the control device 30 ends a series of pieces of processing shown in FIG. 11.

When the other vehicle is detected in front of the host vehicle (step S41, Yes), the control device 30 determines whether the other vehicle in front is an oncoming vehicle, similarly to the processing of step S15 (step S42). When the other vehicle in front is not the oncoming vehicle (step S42; No), the control device 30 ends the series of pieces of processing shown in FIG. 11.

When the other vehicle in front is the oncoming vehicle (step S42; Yes), the control device 30 determines whether the other vehicle (that is, the oncoming vehicle) has entered into a travel lane of the host vehicle (step S43), similarly to the processing of step S17. When the other vehicle (that is, the oncoming vehicle) has not entered into the travel lane of the host vehicle (step S43; No), the control device 30 ends the series of pieces of processing shown in FIG. 11.

When the other vehicle (that is, the oncoming vehicle) has entered into the travel lane of the host vehicle (step S43; Yes), the control device 30 determines whether a distance between the host vehicle and the other vehicle is equal to or smaller than the first threshold d1 (step S44), similarly to the processing of step S18. When the distance between the host vehicle and the other vehicle is larger than the first threshold d1 (step S44; No), the control device 30 ends the series of pieces of processing shown in FIG. 11.

When the distance between the host vehicle and the other vehicle is equal to or smaller than the first threshold d1 (step S44; Yes), the control device 30 determines whether the distance between the host vehicle and the other vehicle is equal to or larger than the second threshold d2 (step S45), similarly to the processing of step S19. When the distance between the host vehicle and the other vehicle is smaller than the second threshold d2 (step S45; No), the control device 30 ends the series of pieces of processing shown in FIG. 11.

When the distance between the host vehicle and the other vehicle is equal to or larger than the second threshold d2 (step S45; Yes), the control device 30 determines whether another condition related to the out-of-vehicle notification is also satisfied, similarly to the processing of step S20 (step S46), When the other condition is not satisfied (step S46; No), the control device 30 ends the series of pieces of processing shown in FIG. 11.

When the other condition is satisfied (step S46; Yes), the control device 30 instructs the BCM 100 to execute an out-of-vehicle notification, that is, headlight flashing (step S47), and ends the series of pieces of processing shown in FIG. 11.

Figure 12:
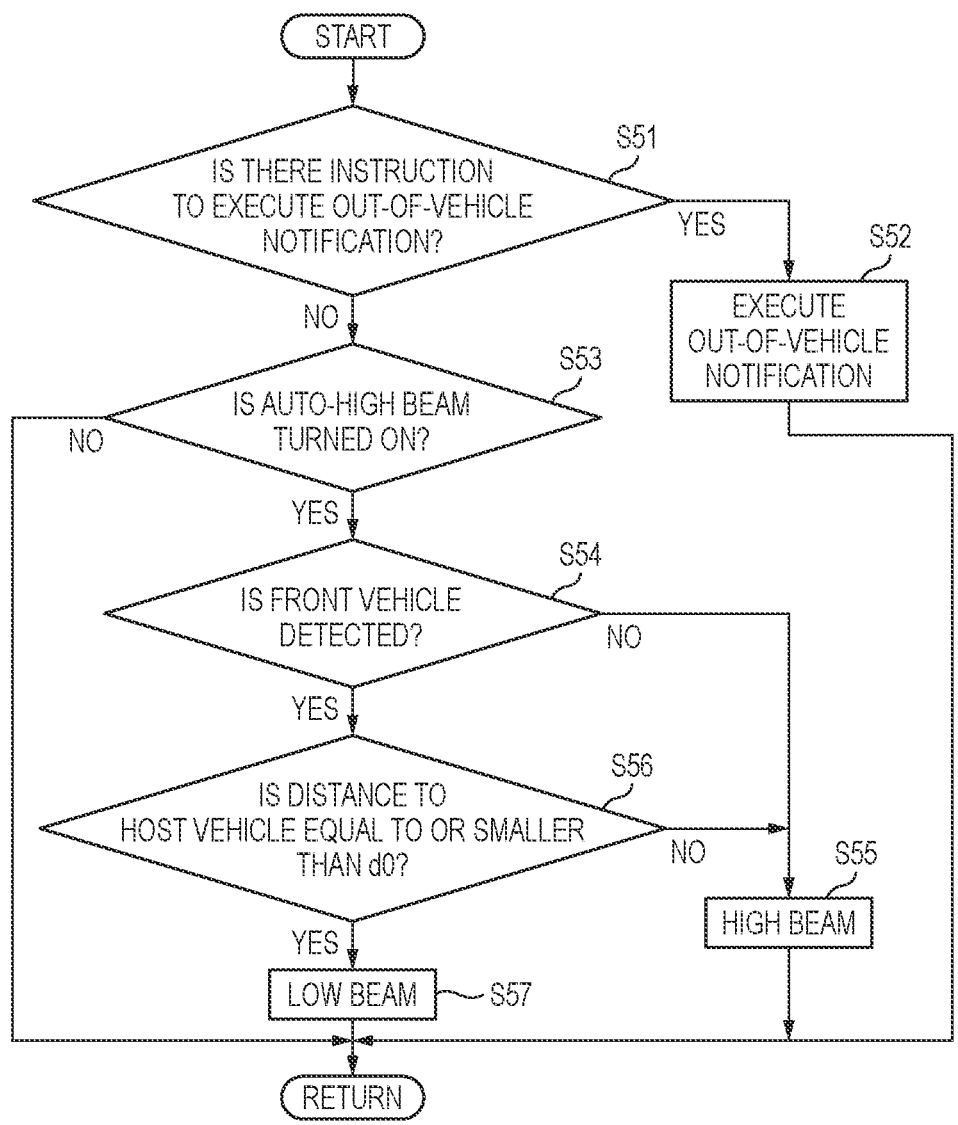
FIG. 12 is a flowchart showing an example of processing executed by a BCM according to the other embodiment.

FIG. 12 is a flowchart showing an example of processing executed by the BCM 100 according to the other embodiment. For example, the BCM 100 repeatedly executes a series of pieces of processing shown in FIG. 12 at a predetermined cycle while the vehicle 1 is being started (for example, while the ignition power supply is turned on).

As shown in FIG. 12, the BCM 100 determines whether there is an instruction to execute an out-of-vehicle notification, that is, headlight flashing from the control device 30 (step S51). When there is an instruction to execute the out-of-vehicle notification (step S51; Yes), the BCM 100 causes the headlight 91 to execute the out-of-vehicle notification (step S52), and ends a series of pieces of processing shown in FIG. 12.

That is, the BCM 100 executes control of the headlight 91 by the out-of-vehicle notification in preference to control of the headlight 91 by automatic illumination switching control exemplified by the processing of steps S53 to S57 to be described later. Accordingly, since the control of the headlight 91 by the out-of-vehicle notification is executed in preference to the control of the headlight 91 by the automatic illumination switching control, it is possible to improve the safety of the vehicle 1.

When there is no instruction to execute the out-of-vehicle notification (step S51; No), the BCM 100 determines whether an auto-high beam is turned on, that is, whether the automatic illumination switching control is being executed (step S53). When the auto-high beam is turned off (step S53; No), that is, when the automatic illumination switching control is not being executed (in non-execution), the BCM 100 ends the series of pieces of processing shown in FIG. 12.

When the auto-high beam is turned on, that is, when the automatic illumination switching control is being executed (step S53; Yes), the BCM 100 determines whether another vehicle is detected in front of the host vehicle based on the surrounding information acquired via the control device 30 (step S54). When no other vehicle is detected (step S54; No), the BCM 100 sets the headlight 91 to a high beam (step S55), and ends the series of pieces of processing shown in FIG. 12.

When the other vehicle is detected in front of the host vehicle (step S54; Yes), the BCM 100 determines whether a distance between the host vehicle and the other vehicle is equal to or smaller than the predetermined distance d0 based on the surrounding information acquired via the control device 30 (step S56). When the distance between the host vehicle and the other vehicle is larger than the predetermined distance d0 (step S56; No), the BCM 100 sets the headlight 91 to the high beam (step S55), and ends the series of pieces of processing shown in FIG. 12.

When the distance between the host vehicle and the other vehicle is equal to or smaller than the predetermined distance do (step S56; Yes), the BCM 100 sets the headlight 91 to a low beam (step S57), and ends the series of pieces of processing shown in FIG. 12.

As described above, in the other embodiment, the control device 30 implemented by the ADAS ECU mainly executes the processing related to the out-of-vehicle notification, and the processing related to the automatic illumination switching control is executed by the BCM 100. In this way, the BCM 100 and the control device 30 implemented by the ADAS ECU cooperate with each other, thereby implementing the same function as that of the control device 30 according to the above-described embodiment, and obtaining the same effect as that of the above-described embodiment.

Although forms of carrying out the present invention have been described above using the embodiments, the present invention is by no means limited to these embodiments, and various modifications and substitutions can be made without departing from the scope of the present invention.

The present specification describes at least the following matters. Components corresponding to those according to the embodiments described above are shown in parentheses. However, the present invention is not limited thereto.

(1) A control device (control device 30) for controlling a vehicle that includes an external sensor (sensor group 10) configured to acquire surrounding information on a host vehicle (vehicle 1) and a headlight (headlight unit 90) configured to illuminate ahead of the host vehicle, the control device including: a processing circuitry (processing unit 32) configured to, when another vehicle (the other vehicle 1A) traveling in an opposite direction to the host vehicle and having a possibility to collide with the host vehicle is detected in front of the host vehicle based on the surrounding information acquired by the external sensor, execute an out-of-vehicle notification using the headlight based on a distance between the host vehicle and the other vehicle, in which when the distance is equal to or smaller than a first threshold (first threshold d1) and equal to or larger than a second threshold (second threshold d2) that is smaller than the first threshold, the processing circuitry executes the out-of-vehicle notification, and when the distance is smaller than the second threshold, the processing circuitry does not execute the out-of-vehicle notification or executes the out-of-vehicle notification with a notification intensity lower than that when the distance is equal to or smaller than the first threshold and equal to or larger than the second threshold.

According to (1), when the other vehicle traveling in a opposite direction to the host vehicle and having a possibility to collide with the host vehicle is detected in front of the host vehicle and the distance between the host vehicle and the other vehicle is equal to or smaller than the first threshold and equal to or larger than the second threshold, it is possible to prompt a driver of the other vehicle to perform an avoidance operation by the out-of-vehicle notification using the headlight. On the other hand, if the out-of-vehicle notification using the headlight is executed even when the distance between the host vehicle and the other vehicle is smaller than the second threshold, the driver of the other vehicle may be dazzled and the avoidance operation by the driver of the other vehicle may be hindered. However, according to (1), when the distance between the host vehicle and the other vehicle is smaller than the second threshold, the out-of-vehicle notification is not executed or the notification intensity of the out-of-vehicle notification is lowered, whereby it is possible to prevent the avoidance operation by the driver of the other vehicle from being hindered by being dazzled due to the out-of-vehicle notification. Therefore, according to (1), the out-of-vehicle notification capable of improving safety of the vehicle can be executed.

(2) In the control device according to (1), the headlight is switchable between a first state and a second state in which the headlight is able to illuminate farther than in the first state, and the out-of-vehicle notification is headlight flashing in which the headlight is switched between the first state and the second state at a predetermined cycle.

According to (2), since the out-of-vehicle notification is headlight flashing performed by the headlight, it is possible to execute the out-of-vehicle notification that is intuitively understandable for the driver of the other vehicle.

(3) In the control device according to (1) or (2), the other vehicle is a vehicle that travels in the opposite direction to the host vehicle and at least a part of which is on a travel lane of the host vehicle.

According to (3), a vehicle that travels in a direction opposite to the host vehicle and at least a part of which is on the travel lane of the host vehicle is highly likely to collide with the host vehicle. According to (3), it is possible to execute the out-of-vehicle notification on such other vehicle that is highly likely to collide with the host vehicle.

(4) In the control device according to any one of (1) to (3), when the other vehicle is detected in front of the vehicle and a curvature of a road on which the host vehicle travels is equal to or larger than a predetermined value, the processing circuitry executes the out-of-vehicle notification based on the distance between the host vehicle and the other vehicle.

When the curvature of the road on which the host vehicle travels is smaller than the predetermined value, detection accuracy of the other vehicle traveling in a opposite direction to the host vehicle and having a possibility to collide with the host vehicle may decrease. According to (4), since the out-of-vehicle notification is executed based on a fact that the curvature of the road on which the host vehicle travels is equal to or larger than the predetermined value, it is possible to prevent the out-of-vehicle notification from being executed in a situation in which no other vehicle that may collide with the host vehicle is actually present.

(5) In the control device according to any one of (1) to (3), when the other vehicle is detected in front of the vehicle and a travel speed of the host vehicle is equal to or larger than a predetermined value, the processing circuitry executes the out-of-vehicle notification based on the distance between the host vehicle and the other vehicle.

When the travel speed of the host vehicle is smaller than the predetermined value, such as when the host vehicle is stopped, a possibility of collision between the host vehicle and the other vehicle is relatively lower than when the travel speed of the host vehicle is equal to or larger than the predetermined value, According to (5), since the out-of-vehicle notification is executed based on a fact that the travel speed of the host vehicle is equal to or larger than the predetermined value, it is possible to prevent the out-of-vehicle notification from being executed in a situation in which the other vehicle is less likely to collide with the host vehicle.

(6) In the control device according to any one of (1) to (3), when the other vehicle is detected in front of the host vehicle and a travel speed of the other vehicle is equal to or larger than a predetermined value, the processing circuitry executes the out-of-vehicle notification based on the distance between the host vehicle and the other vehicle.

When the travel speed of the other vehicle is smaller than the predetermined value, such as when the other vehicle is stopped, a possibility of collision between the host vehicle and the other vehicle is relatively lower than when the travel speed of the other vehicle is equal to or larger than the predetermined value. According to (6), since the out-of-vehicle notification is executed based on a fact that the travel speed of the other vehicle is equal to or larger than the predetermined value, it is possible to prevent the out-of-vehicle notification from being executed in a situation in which the other vehicle is less likely to collide with the host vehicle.

(7) In the control device according to any one of (1) to (6), when a predetermined period has elapsed since the out-of-vehicle notification is started, the processing circuitry ends the out-of-vehicle notification.

According to (7), since the out-of-vehicle notification is ended when the predetermined period has elapsed since the out-of-vehicle notification is started, it is possible to prevent the out-of-vehicle notification from being continuously executed for a long period.

(8) In the control device according to (3), when the other vehicle leaves the travel lane of the host vehicle after the out-of-vehicle notification is started, the processing circuitry ends the out-of-vehicle notification.

According to (8), since the out-of-vehicle notification is ended when the other vehicle leaves the travel lane of the host vehicle after the out-of-vehicle notification is started, it is possible to prevent the out-of-vehicle notification from being continuously executed even in a situation in which the other vehicle is less likely to collide with the host vehicle.

(9) In the control device according to (6), when the travel speed of the other vehicle gets smaller than the predetermined value after the out-of-vehicle notification is started, the processing circuitry ends the out-of-vehicle notification.

According to (9), since the out-of-vehicle notification is ended when the travel speed of the other vehicle gets smaller than the predetermined value after the out-of-vehicle notification is started, it is possible to prevent the out-of-vehicle notification from being continuously executed even in a situation in which the other vehicle is less likely to collide with the host vehicle.

(10) In the control device according to any one of (1) to (6), when a steering amount or a steering torque of the host vehicle gets equal to or larger than a predetermined value after the out-of-vehicle notification is started, the processing circuitry ends the out-of-vehicle notification.

According to (10), since the out-of-vehicle notification is ended when the steering amount or the steering torque of the host vehicle gets equal to or larger than the predetermined value after the out-of-vehicle notification is started, it is possible to prevent the out-of-vehicle notification from being continuously executed even in a situation in which the other vehicle is less likely to collide with the host vehicle due to a direction change of the host vehicle.

(11) In the control device according to any one of (1) to (6), when a change amount of a yaw angle of the host vehicle from a start of the out-of-vehicle notification gets equal to or larger than a predetermined value after the out-of-vehicle notification is started, the processing circuitry ends the out-of-vehicle notification.

According to (11), since the out-of-vehicle notification is ended when the change amount of the yaw angle of the host vehicle from the start of the out-of-vehicle notification gets equal to or larger than the predetermined value after the out-of-vehicle notification is started, it is possible to prevent the out-of-vehicle notification from being continuously executed even in a situation where the other vehicle is less likely to collide with the host vehicle due to a direction change of the host vehicle.

What is claimed is:

1. A control device for controlling a vehicle that includes an external sensor configured to acquire surrounding information on a host vehicle and a headlight configured to illuminate ahead of the host vehicle, the control device comprising:
a processing circuitry configured to, when another vehicle traveling in an opposite direction to the host vehicle and having a possibility to collide with the host vehicle is detected in front of the host vehicle based on the surrounding information acquired by the external sensor, execute an out-of-vehicle notification using the headlight based on a distance between the host vehicle and the another vehicle, wherein
when the another vehicle is detected in front of the host vehicle and a travel speed of the host vehicle is equal to or larger than a predetermined value, the processing circuitry executes the out-of-vehicle notification based on the distance between the host vehicle and the another vehicle,
when the distance is equal to or smaller than a first threshold and equal to or larger than a second threshold that is smaller than the first threshold, the processing circuitry executes the out-of-vehicle notification, and
when the distance is smaller than the second threshold, the processing circuitry does not execute the out-of-vehicle notification or executes the out-of-vehicle notification with a notification intensity lower than that when the distance is equal to or smaller than the first threshold and equal to or larger than the second threshold.

2. The control device according to claim 1, wherein
the headlight is switchable between a first state and a second state in which the headlight is able to illuminate farther than in the first state, and
the out-of-vehicle notification is headlight flashing in which the headlight is switched between the first state and the second state at a predetermined cycle.

3. The control device according to claim 1, wherein
the another vehicle is a vehicle that travels in the opposite direction to the host vehicle and at least a part of which is on a travel lane of the host vehicle.

4. The control device according to claim 1, wherein
when the another vehicle is detected in front of the host vehicle and a curvature of a road on which the host vehicle travels is equal to or larger than a predetermined value, the processing circuitry executes the out-of-vehicle notification based on the distance between the host vehicle and the another vehicle.

5. The control device according to claim 1, wherein
when the another vehicle is detected in front of the host vehicle and a travel speed of the another vehicle is equal to or larger than a predetermined value, the processing circuitry executes the out-of-vehicle notification based on the distance between the host vehicle and the another vehicle.

6. The control device according to claim 1, wherein
when a predetermined period has elapsed since the out-of-vehicle notification is started, the processing circuitry ends the out-of-vehicle notification.

7. The control device according to claim 3, wherein
when the another vehicle leaves the travel lane of the host vehicle after the out-of-vehicle notification is started, the processing circuitry ends the out-of-vehicle notification.

8. The control device according to claim 5, wherein
when the travel speed of the another vehicle gets smaller than the predetermined value after the out-of-vehicle notification is started, the processing circuitry ends the out-of-vehicle notification.

9. The control device according to claim 1, wherein
when a steering amount or a steering torque of the host vehicle gets equal to or larger than a predetermined value after the out-of-vehicle notification is started, the processing circuitry ends the out-of-vehicle notification.

10. The control device according to claim 1, wherein
when a change amount of a yaw angle of the host vehicle from a start of the out-of-vehicle notification gets equal to or larger than a predetermined value after the out-of-vehicle notification is started, the processing circuitry ends the out-of-vehicle notification.

* * * * *